United States Patent
Usui et al.

(10) Patent No.: US 7,330,365 B2
(45) Date of Patent: Feb. 12, 2008

(54) SYNCHRONOUS COMMUTATION DC-DC CONVERTER

(75) Inventors: Hiroshi Usui, Niiza (JP); Ryuichi Furukoshi, Niiza (JP); Yukinari Fukumoto, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 174 days.

(21) Appl. No.: 10/569,861

(22) PCT Filed: Jun. 14, 2004

(86) PCT No.: PCT/JP2004/008314

§ 371 (c)(1),
(2), (4) Date: Feb. 27, 2006

(87) PCT Pub. No.: WO2005/025043

PCT Pub. Date: Mar. 17, 2005

(65) Prior Publication Data

US 2007/0008757 A1 Jan. 11, 2007

(30) Foreign Application Priority Data

Sep. 2, 2003 (JP) .............................. 2003-310350

(51) Int. Cl.
*H02M 3/335* (2006.01)
(52) U.S. Cl. ..................................................... 363/89
(58) Field of Classification Search .................. 363/15, 363/16, 84, 89, 127
See application file for complete search history.

(56) References Cited

U.S. PATENT DOCUMENTS

| | | | | |
|---|---|---|---|---|
| 5,420,777 | A | * | 5/1995 | Muto ....................... 363/21.17 |
| 6,169,675 | B1 | * | 1/2001 | Shimamori et al. ........... 363/70 |
| 6,778,412 | B2 | * | 8/2004 | Nagai et al. ................... 363/53 |

FOREIGN PATENT DOCUMENTS

| | | |
|---|---|---|
| JP | 6-343262 | 12/1994 |
| JP | 8-066023 | 3/1996 |
| JP | 9-322532 | 12/1997 |
| JP | 11-313479 | 11/1999 |

* cited by examiner

*Primary Examiner*—Adolf Berhane
(74) *Attorney, Agent, or Firm*—Bachman & LaPointe, P.C.

(57) ABSTRACT

A synchronous commutation DC-DC converter comprises a current detection transformer (51) for detecting currents ($I_{Q1}$, $I_{Q2}$) flowing through the primary circuit, first and second DC bias power sources (53, 54) generating bias voltages ($V_{BS1}$, $V_{BS2}$) larger than the voltage corresponding to the exciting current of a transformer (4), and first and second comparators (55, 57) for driving first and second commutation MOS-FETs (7, 8) when the detection voltage ($V_{DT}$) of a current detection resistor (52) exceeds the bias voltages ($V_{BS1}$, $V_{BS2}$) of the first and second DC bias power sources (53, 54). Since each commutation MOS-FET (7, 8) in the secondary circuit is driven in synchronism with the currents ($I_{Q1}$, $I_{Q2}$) of the primary circuit from which the exciting current component of the transformer (4) is removed, it is possible to minimize switching loss of each commutation MOS-FET (7, 8) in the secondary circuit and enhance conversion efficiency of the synchronous commutation DC-DC converter.

6 Claims, 14 Drawing Sheets

SYNCHRONOUS COMMUTATION DC-DC CONVERTER

TECHNICAL FIELD

This invention relates to a DC-DC converter of synchronous rectification type which can improve the conversion efficiency by reduction in switching loss in a secondary side circuit of the converter.

BACKGROUND OF THE INVENTION

A DC-DC converter of synchronous rectification type is known as a switching power source device of high conversion efficiency which comprises a transformer, primary and secondary side circuits of the transformer. The primary side circuit comprises at least one main switching element and a primary winding of the transformer connected in series with a DC power source. The secondary side circuit comprises a secondary winding of the transformer electromagnetically coupled to the primary winding, and at least one rectifying switching element connected between the secondary winding and a load. The main switching element is turned on and off during the switching operation, and the rectifying switching element is driven synchronously with operation of the main switching element to supply a DC output to the load through the secondary side circuit. A prior art DC-DC converter of synchronous rectification type shown in FIG. 14, comprises first and second main MOS-FETs 2 and 3 as first and second main switching elements connected in series to a DC power source 1; a primary winding 4a of a transformer 4 connected between a junction of first and second main MOS-FETs 2 and 3 and a negative terminal of DC power source 1 through a current resonance capacitor 5 connected in series to primary winding 4a of transformer 4; a voltage pseudo resonance capacitor 6 connected between drain and source terminals of first main MOS-FET 2; first and second rectifying MOS-FETs 7 and 8 as first and second rectifying switching elements connected to secondary windings 4b and 4c of transformer 4; first and second output rectifying diodes 9 and 10 connected to source and drain terminals of respectively first and second rectifying MOS-FETs 7 and 8; and an output smoothing capacitor 11 connected between a center tap of secondary windings 4b and 4c and each source terminal of first and second rectifying MOS-FETs 7 and 8. Accordingly, a primary circuit is composed of first and second main MOS-FETs 2 and 3, primary winding 4a of transformer 4, current resonance capacitor 5 and voltage pseudo resonance capacitor 6, and a secondary circuit is composed of secondary windings 4b and 4c of transformer 4, first and second rectifying MOS-FETs 7 and 8, first and second output rectifying diodes 9 and 10 and output smoothing capacitor 11.

Transformer 4 comprises a drive winding 4d electromagnetically coupled with primary winding 4a, and a leakage inductance 4e as a current resonance reactor or coil connected in series to primary winding 4a. Drive winding 4d supplies active DC power to a drive power source port $V_{CC}$ of control circuit 21 through a rectifying diode 12 and a smoothing capacitor 13. Connected between a positive terminal of DC power source 1 and smoothing capacitor 13 is a trigger resistor 14 for introducing electric current from DC power source 1 to smoothing capacitor 13 at the time of start-up of the converter to electrically charge smoothing capacitor 13 so that control circuit 21 starts operation when smoothing capacitor 13 is charged to a certain voltage level. A charge pump circuit is made up of a rectifying diode 15 and a smoothing capacitor 16 connected in series between trigger resistor 14 and a junction of first and second main MOS-FETs 2 and 3 to provide DC power between power source terminals $V_B$ and $V_S$ on the high voltage side of control circuit 21. An output voltage detector 17 is connected to both ends of an output smoothing capacitor 11 to detect DC output voltage $V_O$, and a photo-diode 19 of a photo-coupler 18 is connected between center tap of secondary windings 4b and 4c and output voltage detector 17. A detection output signal of photo-diode 19 is given to a photo-transistor 20 of photo-coupler 18 connected to a feedback signal input terminal $V_{FB}$ of control circuit 21.

Control circuit 21 comprises an oscillator 22; a D-flip flop (DFF) 23 for receiving outputs from oscillator 22; a first time-adding circuit 24 connected to one output terminal of DFF 23; a first buffer amplifier 25 for receiving outputs from first time-adding circuit 24; a second time-adding circuit 26 connected to the other output terminal of DFF 23; a level shifter 27 for receiving outputs from second time-adding circuit 26; and a second buffer amplifier 28 for receiving outputs from level shifter 27. Oscillator 22 generates pulse signals of the frequency which can vary in response to the level of output voltage $V_O$, namely output signal from output voltage detector 17 given to feedback input terminal $V_{FB}$ of control circuit 21 through photo-coupler 18. DFF 23 receives pulse signals from oscillator 22 to produce first and second drive pulse signals $V_{G1}$ and $V_{G2}$ inverted from $V_{G1}$ at one and the other output terminals. First and second time-adding circuits 24 and 26 add a dead time of a constant span to respectively first and second drive pulse signals $V_{G1}$ and $V_{G2}$ from DFF 23. First buffer amplifier 25 receives dead time-added first drive pulse signals $V_{G1}$ from first time-adding circuit 24 and applies them to gate terminal of first main MOS-FET 2. Dead time-added second drive pulse signals $V_{G2}$ is forwarded from second time-adding circuit 26 to level shifter 27 which elevates reference voltage level of dead time-added second drive pulse signals $V_{G2}$ from ground level to voltage level at a junction between a source terminal of first main MOS-FET 2 and a drain terminal of second main MOS-FET 3. Second buffer amplifier 28 amplifies second drive pulse signals $V_{G2}$ from level shifter 27 and forwards them to gate terminal of second main MOS-FET 3. This causes control circuit 21 to modulate frequency of first and second drive pulse signals $V_{G1}$ and $V_{G2}$ (PFM or Pulse Frequency Modulation) in response to voltage level of output signals detected by output voltage detector 17, and forwards them to each gate terminal of first and second main MOS-FETs 2 and 3 which therefore can alternately be turned on and off with the frequency corresponding to voltage level of output signals detected by output voltage detector 17.

Gate terminal of first main MOS-FET 2 is connected through a first capacitor 29 and a first pulse transformer 31 to a gate terminal of a first rectifying MOS-FET 7 so that first drive pulse signals $V_{G1}$ from control circuit 21 is supplied through first capacitor 29 to a primary winding 32 of first pulse transformer 31 whose secondary winding 33 produces to gate terminal of first rectifying MOS-FET 7 first synchronous drive pulse signals $V_{SC1}$ of the similar or same waveform to those of first drive pulse signals $V_{G1}$. Also, gate terminal of second main MOS-FET 3 is connected through a second capacitor 30 and a second pulse transformer 34 to a gate terminal of a second rectifying MOS-FET 8 so that second drive pulse signals $V_{G2}$ from control circuit 21 is supplied through second capacitor 30 to a primary winding 35 of second pulse transformer 34 whose secondary winding 36 produces to gate terminal of second rectifying MOS-FET 8 second synchronous drive pulse signals $V_{SC2}$ of the similar or same waveform to those of second drive pulse signals $V_{G2}$. This causes first and second rectifying MOS-FETs 7 and 8 on the secondary side to be turned on and off in synchronization with the on and off operation of first and second main MOS-FETs 2 and 3 on the primary side to generate to a load not shown DC output voltage $V_O$ of substantially constant level between output terminals of the secondary circuit.

In operation of the DC-DC converter of synchronous rectification type shown in FIG. 14, when a power switch not shown therein is turned on, an electric current flows from DC power source 1 through trigger resistor 14 to smoothing capacitor 13 to electrically charge smoothing capacitor 13. When charged voltage in smoothing capacitor 13 comes up to a start-up level for control circuit 21, it starts the operation. At the moment, control circuit 21 produces first and second drive pulse signals $V_{G1}$ and $V_{G2}$ to each gate terminal of first and second main MOS-FETs 2 and 3 to start turning them on and off. When second main MOS-FET 3 is turned on, a winding current $I_{Q2}$ runs from DC power source 1 through second main MOS-FET 3, leakage inductance 4e and primary winding 4a of transformer 4 and current resonance capacitor 5 to DC power source 1 of primary side circuit to electrically charge current resonance capacitor 5. Winding current $I_{Q2}$ is a composite current of excitation current through primary winding 4a of transformer 4 and resonance current of the resonance frequency determined by capacitance of current resonance capacitor 5 and leakage inductance 4e of transformer 4. As second rectifying MOS-FET 8 is concurrently turned on synchronously with turning-on operation of second main MOS-FET 3, an electric current $I_{S2}$, which has substantially same resonance frequency as that of resonance current, flows from second secondary winding 4c of transformer 4 through a parallel circuit of second rectifying diode 10 and second rectifying MOS-FET 8 to output smoothing capacitor 11 and load.

When second main MOS-FET 3 is switched off while winding current $I_{Q2}$ flows through primary side circuit, voltages $V_{Q1}$ between drain and source terminals of first main MOS-FET 2 and $V_{Q2}$ between drain and source terminals of second main MOS-FET 3, provide pseudo resonance voltage of the resonance frequency determined by capacitance of voltage pseudo resonance capacitor 6 and composite inductance of leakage inductance 4e and excitation inductance not shown of transformer 4. At the same time, excitation current, which has passed through primary winding 4a of transformer 4 and second main MOS-FET 3, is diverted toward a pseudo diode not shown but appearing between drain and source terminals of first main MOS-FET 2. When first main MOS-FET 2 is turned on while excitation current is diverted through pseudo diode of first main MOS-FET 2, this excitation current naturally decreases, and then, the polarity is inverted to cause electric current $I_{Q1}$ to flow from current resonance capacitor 5 through primary winding 4a and leakage inductance 4e of transformer 4 and first main MOS-FET 2 to discharge current resonance capacitor 5. This electric current $I_{Q1}$ through first main MOS-FET 2 has the adverse polarity to that of winding current $I_{Q2}$, and provides a composite current of excitation current through primary winding 4a of transformer 4 and resonance current of the resonance frequency determined by capacitance of current resonance capacitor 5 and leakage inductance 4e of transformer 4. Also, as first rectifying MOS-FET 7 is turned on synchronously with the turning-on operation of first main MOS-FET 2, a rectified output current $I_{S1}$, which has substantially same resonance frequency as that of resonance current, flows from first sec- ondary winding 4b of transformer 4 through a parallel circuit of first rectifying diode 9 and first rectifying MOS-FET 7 to output smoothing capacitor 11 and load.

When first main MOS-FET 2 is switched off while electric current $I_{Q1}$ flows through primary side circuit, voltages $V_{Q1}$ between drain and source terminals of first main MOS-FET 2 and $V_{Q2}$ between drain and source terminals of second main MOS-FET 3, provide pseudo resonance voltage of the resonance frequency determined by capacitance of voltage pseudo resonance capacitor 6 and composite inductance of leakage inductance 4e and excitation inductance not shown of transformer 4. At the same time, excitation current, which has passed through primary winding 4a of transformer 4 and first main MOS-FET 2, is diverted toward a pseudo diode not shown but appearing between drain and source terminals of second main MOS-FET 3. When second main MOS-FET 3 is turned on while excitation current is diverted through pseudo diode of second main MOS-FET 3, this excitation current naturally decreases, and then, the polarity is inverted to cause electric current $I_{Q2}$ to flow through second main MOS-FET 3. FIGS. 15(A), 15(B) and 15(C) indicate respectively waveforms of voltage $V_{Q1}$ between source and drain terminals of first main MOS-FET 2, electric current $I_{Q1}$ through first main MOS-FET 2, and electric current through first secondary winding 4b of transformer 4.

After that, the above-mentioned synchronous rectifying operation is repeated to produce DC output voltage $V_O$ of substantially constant level from secondary side circuit to load. As switching frequency of first and second main MOF-FETs 2 and 3 is higher than resonance frequency determined by capacitance of current resonance capacitor 5 and leakage inductance 4e of transformer 4, DC output to load can be controlled by increasing switching frequency of first and second main MOS-FETs 2 and 3. A DC-DC converter of synchronous rectification type similar to the foregoing is shown by for example Japanese Patent Disclosure No. 2000-23455 (Page 5, FIG. 3).

Now, rectified output currents $I_{S1}$ and $I_{S2}$ flowing through secondary side circuit of transformer 4 do not exactly synchronize with the on-period of first and second main MOS-FETs 2 and 3 of primary side circuit as shown in FIGS. 15(C) and 15(A), since first and second rectifying MOS-FETs 7 and 8 of secondary side circuit are turned on synchronously with the turning-on of first and second main MOS-FETs 2 and 3 in DC-DC converter shown in FIG. 14. Accordingly, adverse current occurs which flows from output smoothing capacitor 11 toward first and second secondary windings 4b and 4c of transformer 4 because first and second rectifying MOS-FETs 7 and 8 are turned on during the period of no electric current through first and second output rectifying diodes 9 and 10 of secondary side circuit. This adverse current provides a circulating current which reciprocates between primary and secondary side circuits, and further disadvantageously incurs unnecessary switching loss through first and second main MOS-FETs 2 and 3 on primary side and first and second rectifying MOS-FETs 7 and 8, thereby detrimentally reducing the conversion efficiency in DC-DC converter.

Accordingly, an object of the present invention is to provide a DC-DC converter of synchronous rectification type capable of improving the conversion efficiency by reducing switching loss in secondary side circuit.

SUMMARY OF THE INVENTION

The DC-DC converter of synchronous rectification type according to the present invention comprises: at least one main switching element (2, 3) and a primary winding (4a) of a transformer (4) as a primary side circuit connected to a DC power source (1); at least one rectifying switching element (7, 8) as a secondary side circuit connected between a secondary winding (4b, 4c) of transformer (4) electromagnetically coupled to primary winding (4a) and an electric load; a current detector (51) for discerning electric current ($I_{Q1}$, $I_{Q2}$) flowing through the primary side circuit to produce a detection voltage ($V_{DT}$) corresponding to the discerned current ($I_{Q1}$, $I_{Q2}$); biasing means (53, 54) for producing a bias voltage ($V_{BS1}$, $V_{BS2}$) higher than voltage corresponding to excitation current through transformer (4); and a comparator (55, 57) for activating rectifying switching element (7, 8) when current detector (51) produces the detection voltage over bias voltage ($V_{BS1}$, $V_{BS2}$) to turn rectifying switching element (7, 8) on in synchronization with switching operation of main switching element (2, 3) in order to supply DC output ($V_O$) from the secondary side circuit to the electric load.

When detected voltage ($V_{DT}$) from current detector (51) exceeds bias voltage ($V_{BS1}$, $V_{BS2}$) from biasing means (53, 54) higher than voltage corresponding to excitation current through transformer (4), rectifying switching element (7, 8) is turned on synchronously with electric current ($I_{Q1}$, $I_{Q2}$) flowing through the primary side circuit except excitation current component through transformer (4) deducted by comparator (55, 57). This causes comparator (55, 57) to drive rectifying switching element (7, 8) in proportion to rectified output current ($I_{S1}$, $I_{S2}$) flowing through the secondary side circuit to prevent power loss resulted from unnecessary circulating current. Accordingly, the secondary side circuit can control power loss caused by rectifying switching element (7, 8) to a minimal level to improve conversion efficiency for the DC-DC converter.

The DC-DC converter of synchronous rectification type according to another embodiment of the invention, comprises a current detector (51) for discerning an electric current ($I_{Q1}$, $I_{Q2}$) flowing through primary side circuit; biasing means (53, 54) for producing a bias voltage ($V_{BS1}$, $V_{BS2}$); a ramp signal generator for issuing a ramp signal ($V_{RP}$) proportional to voltage relative to excitation current through transformer (4); and a comparator (55, 57) for driving rectifying switching elements (7, 8) when detected voltage ($V_{DT}$) from current detector (51) exceeds the superimposed voltage of biased voltage ($V_{BS1}$, $V_{BS2}$) of biasing means (53, 54) and ramp signal ($V_{RP}$) from ramp signal generator. The DC-DC converter of synchronous rectification type according to still another embodiment of the invention, comprises a current detector (51) for detecting electric current ($I_{Q1}$, $I_{Q2}$) flowing through primary side circuit; biasing means (53, 54) for producing a bias voltage ($V_{BS1}$, $V_{BS2}$); a ramp signal generator for issuing a ramp signal ($V_{RP}$) proportional to voltage relative to excitation current through transformer (4); and a comparator (55, 57) for driving rectifying switching elements (7, 8) when detected voltage ($V_{DT}$) from current detector (51) exceeds the superimposed voltage of biased voltage ($V_{BS1}$, $V_{BS2}$) of biasing means (53, 54) and ramp signal ($V_{RP}$) from ramp signal generator. Since ramp signals ($V_{RP}$) from ramp signal generator have the substantially similar voltage waveform to that of excitation current flowing through primary winding (4a) of transformer (4), ramp signals ($V_{RP}$) can be used to cancel or offset excitation current component contained in electric current ($I_{Q1}$, $I_{Q2}$) in primary side circuit detected by current detector (51). Accordingly, the converter can efficiently drive rectifying switching elements (7, 8) accurately in proportion to rectified output currents ($I_{S1}$, $I_{S2}$) through secondary side circuit.

In the present invention, rectifying switching elements in secondary side circuit are driven synchronously with electric current in primary side circuit excluding excitation current through transformer, in other words, when detected voltage by current detector exceeds biased voltage by biasing means higher than the voltage corresponding to excitation current through transformer. This causes rectifying switching elements to operate commensurately to rectified output current flowing through secondary side circuit, inhibiting power loss resulted from unnecessary circulating current to minimize power loss incurred with rectifying switching elements in secondary side circuit and improve conversion efficiency in the converter. Providing a ramp signal generator in the converter for generating ramp signals proportional to voltage relative to excitation current through transformer, ramp signals from ramp signal generator are used to cancel or offset excitation current component through transformer contained in electric current in primary side circuit detected by current detector so that rectifying switching elements can efficiently be driven exactly in proportion to rectified output current in secondary side circuit. As biasing means may be of any optional bias voltage generator capable of producing electric current lower than excitation current component through transformer, it is advantageous to adopt biasing means generating the lower biasing voltage. In particular, if the present invention is applied to a DC-DC converter of synchronous resonance rectification type, it may utilize rectifying switching elements of lower withstand voltage and lower impedance during the on-period to provide an inexpensive DC-DC converter of synchronous rectification type having the extremely high conversion efficiency.

(1) . . . a DC power source, (2) . . . a first main MOS-FET (a first main switching element), (3) . . . a second main MOS-FET (a second main switching element), (4) . . . a transformer, (4a) . . . a primary winding, (4b, 4c) . . . secondary windings, (4d) . . . a drive winding, (4e) . . . a leakage inductance, (5) . . . a current resonance capacitor, (6) . . . a voltage pseudo resonance capacitor, (7) . . . a first rectifying MOS-FET (a first rectifying switching element), (8) . . . a second rectifying MOS-FET (a second rectifying switching element), (9) . . . a first output diode, (10) . . . a second output diode, (11) . . . an output smoothing capacitor, (12) . . . a rectifying diode, (13) . . . a smoothing capacitor, (14) . . . a start-up resistor, (15) . . . a rectifying diode, (16) . . . a smoothing capacitor, (17) . . . an output voltage detector, (18) . . . a photo-coupler, (19) . . . a photo-diode, (20) . . . a photo-transistor, (21) . . . a control circuit, (22) . . . an oscillator, (23) . . . a D-flip flop, (24) . . . a first time-adder, (25) . . . a first buffer amplifier of low voltage side, (26) . . . a second time-adder, (27) . . . a level shifter, (28) . . . a second buffer amplifier of high voltage side, (29) . . . a first capacitor, (30) . . . a second capacitor, (31) . . . a first pulse transformer, (32) . . . a primary winding, (33) . . . a secondary winding, (34) . . . a second pulse transformer, (35) . . . a primary winding, (36) . . . a secondary winding, (37) . . . an additional current resonance capacitor, (38) . . . an additional voltage pseudo resonance capacitor, (39) . . . a current resonance reactor, (51) . . . a current detecting transformer (a current detector), (52) . . . a current detecting resistor, (53) . . . a first DC bias power supply (biasing means), (54) . . . a second DC bias power supply (biasing means), (55) . . . a first comparator (first comparing means), (56) . . . a first buffer amplifier, (57) . . . a second comparator (second comparing means), (58) . . . a second buffer amplifier, (59) . . . a bias power supply, (60) . . . an operational amplifier (a synchronizing signal generator), (61) . . . a resistor, (62) . . . an integral capacitor, (63) . . . a drive power supply, (64) . . . a waveform shaper (waveform shaping means), (65) . . . a shunt capacitor, (66) . . . a transfer resistor, (67, 68, 70) . . . resistors, (69) . . . a bias power supply.

BEST MODE FOR CARRYING OUT THE INVENTION

Figure 14:
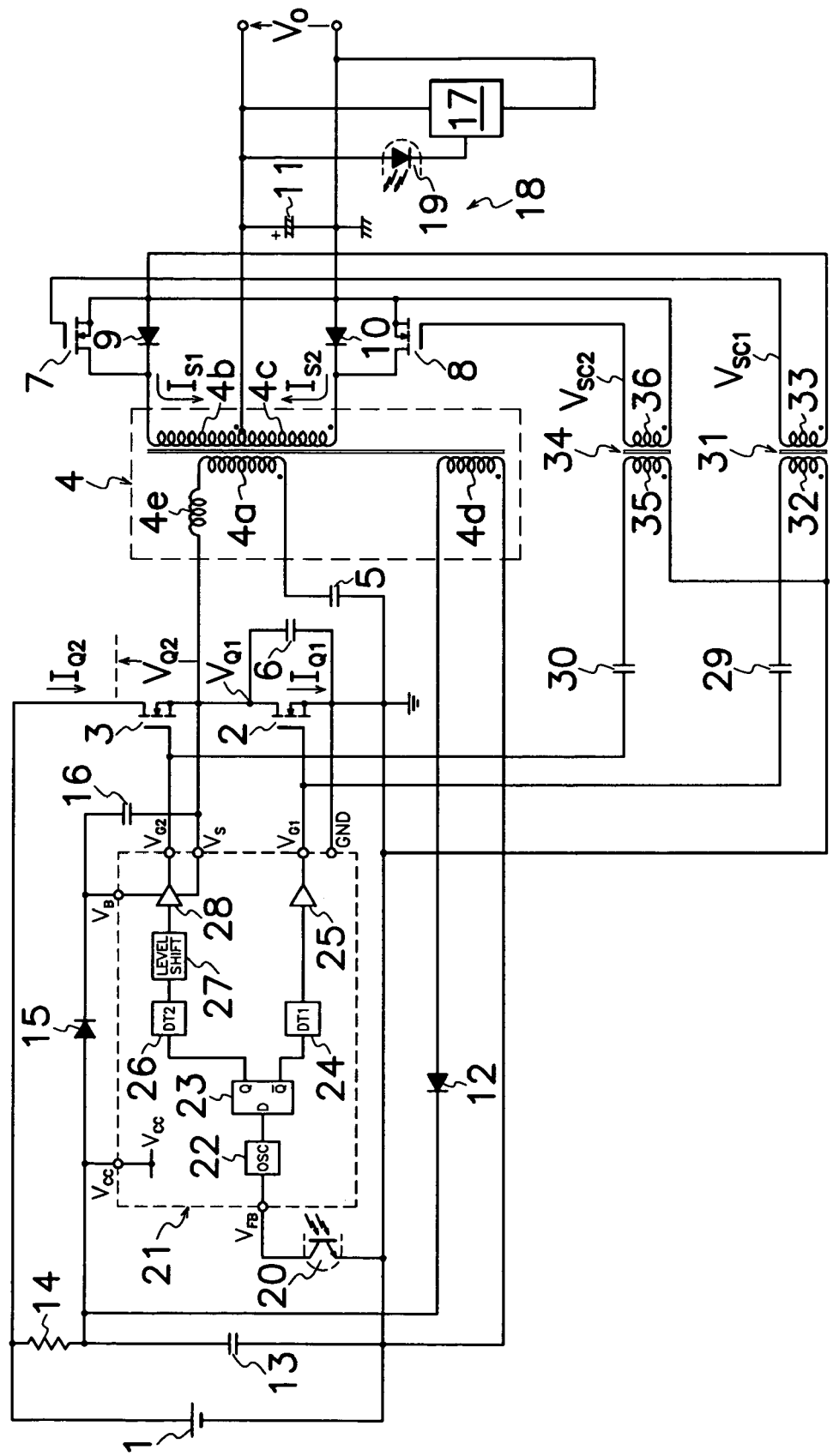
FIG. 14 is an electric circuit diagram of an example of prior art DC-DC converters of synchronous rectification type.
Figure 15:
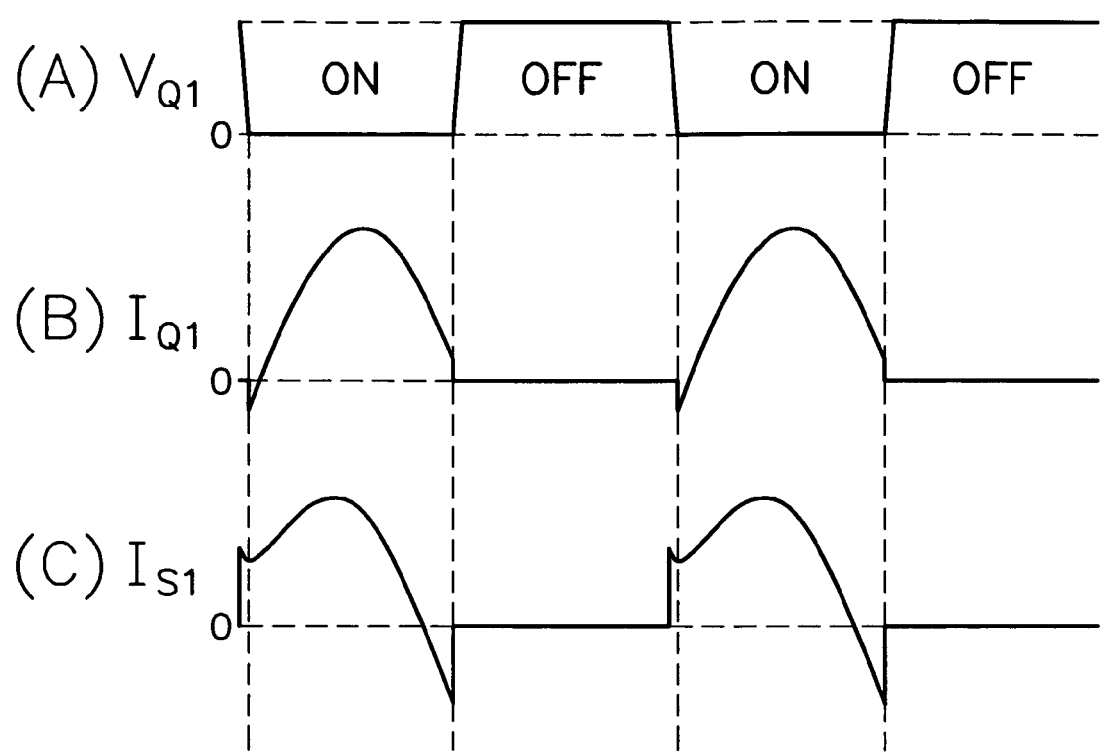
FIG. 15 is a time chart of waveforms of a voltage and electric currents at selected locations in FIG. 14.

Five embodiments of current-resonant DC-DC converter of synchronous rectification type according to the present invention will be described hereinafter with reference to FIGS. 1 to 12 of the drawings. Same reference symbols are applied to similar portions in FIGS. 1 to 12 to those shown in FIGS. 14 and 15 omitting explanation therefor.

Figure 1:
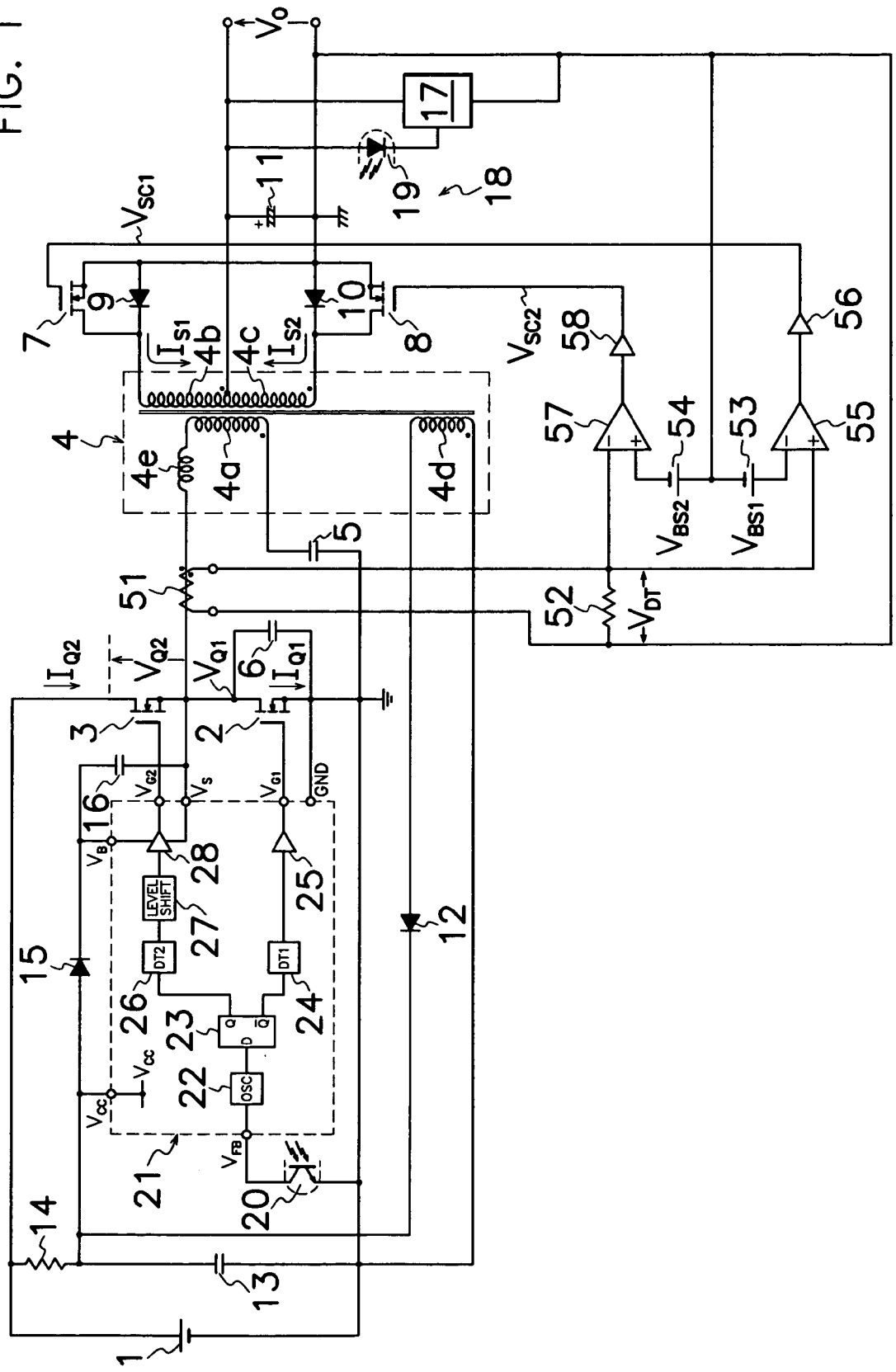
FIG. 1 is an electric circuit diagram showing a first embodiment of the current-resonant DC-DC converter of synchronous rectification type according to the present invention.
Figure 2:
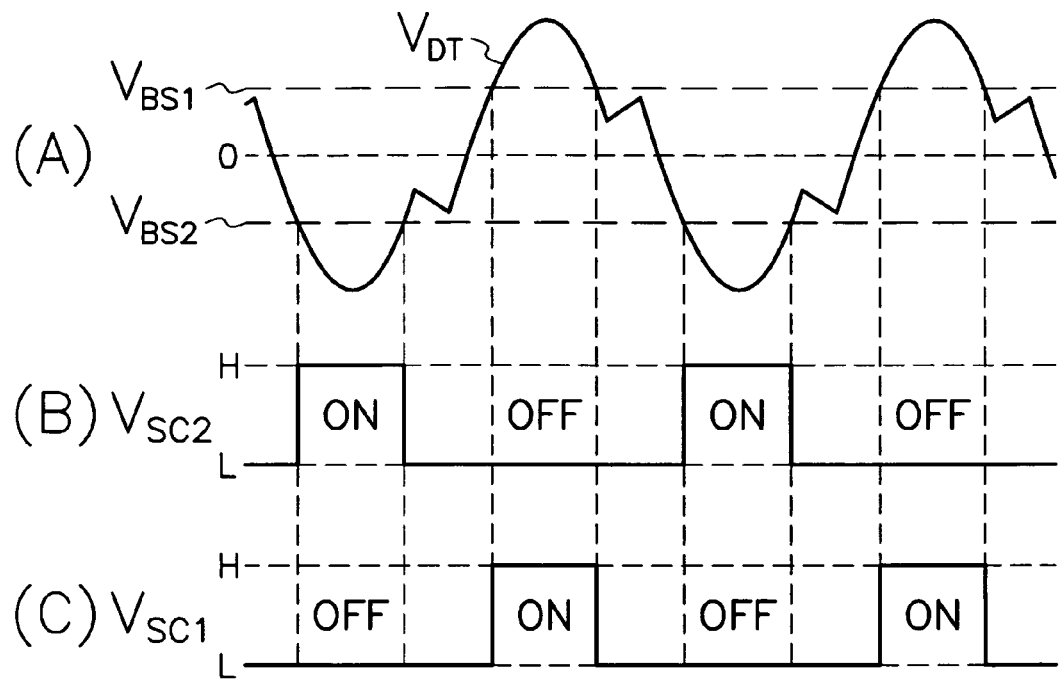
FIG. 2 is a time chart representing the relationships among detected voltage on current detection resistor and synchronous drive pulses for each rectifying MOS-FETs shown in FIG. 1.
Figure 3:
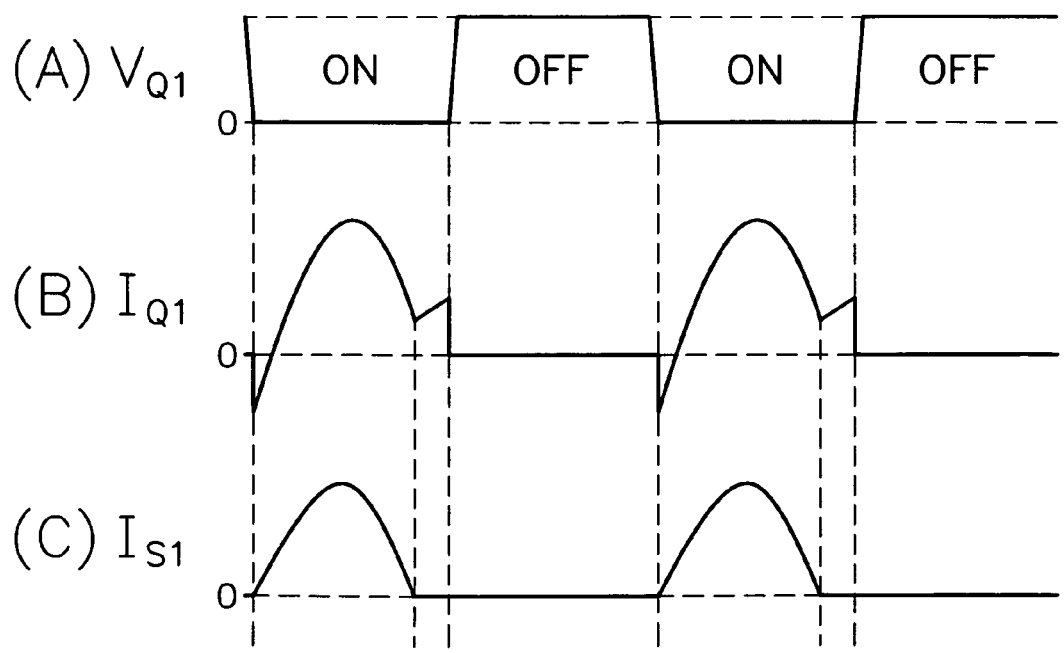
FIG. 3 is a time chart of waveforms of a voltage and electric currents at selected locations.

As shown in FIG. 1, a first embodiment of the DC-DC converter of synchronous rectification type according to the present invention, comprises a current detection transformer 51 as current detecting means for detecting electric currents $I_{Q1}$, $I_{Q2}$ flowing through primary side circuit of a transformer 4; a current detecting resistor 52 for converting electric current detected by detection transformer 51 into a corresponding voltage $V_{DT}$; first and second DC bias power supplies 53 and 54 as biasing means for producing bias voltages $V_{BS1}$ and $V_{BS2}$ higher than voltage corresponding to excitation current through transformer 4; a first comparator 55 as first comparing means for producing a first synchronous drive pulse signal $V_{SC1}$ to turn first rectifying MOS-FET 7 on when detection voltage $V_{DT}$ by current detecting resistor 52 to non-inverted input terminal + of first comparator 55 exceeds a bias voltage $V_{BS1}$ of first DC bias power supply 53 applied to inverted input terminal − of first comparator 55; a first buffer amplifier 56 for directing first synchronous drive pulse signal $V_{SC1}$ from first comparator 55 to a gate terminal of first rectifying MOS-FET 7; a second comparator 57 as second comparing means for producing a second synchronous drive pulse signal $V_{SC2}$ to turn second rectifying MOS-FET 8 on when detection voltage $V_{DT}$ by current detecting resistor 52 to an inverted input terminal − of second comparator 57 exceeds a bias voltage $V_{BS2}$ of second DC bias power supply 54 applied to non-inverted input terminal + of second comparator 57; and a second buffer amplifier 58 for directing second synchronous drive pulse signal $V_{SC2}$ from second comparator 57 to a gate terminal of second rectifying MOS-FET 8. Cathode and anode terminals of first DC bias power supply 53 are connected respectively to ground and inverted input terminal − of first comparator 55. Anode and cathode terminals of second DC bias power supply 54 are connected respectively to ground and non-inverted input terminal + of second comparator 57. Two black points marked on the right end of current detection transformer 51 denote that a primary winding not shown connected on a line between a junction of first and second main MOS-FETs 2 and 3 and primary winding 4a has a same polarity as secondary winding connected between opposite ends of current detecting resistor 52. Other components than the above components are substantially similar to those used in DC-DC converter of synchronous rectification type shown in FIG. 14 except omission of first and second capacitors 29 and 30 and first and second pulse transformers 31 and 34.

In operation, when second main MOS-FET 3 is turned on, winding current $I_{Q2}$ flows from DC power source through second main MOS-FET 3, leakage inductance 4e and primary winding 4a of transformer 4, current resonance capacitor 5 to DC power source in primary side circuit. Winding current $I_{Q2}$ is a composite current of excitation current through primary winding 4a of transformer 4 and resonance current of resonance frequency determined by capacitance of current resonance capacitor 5 and leakage inductance 4e of transformer 4. Winding current $I_{Q2}$ in primary side circuit is detected by current detection transformer 51 to convert detected winding current $I_{Q2}$ into a corresponding detected voltage $V_{DT}$ by current detecting resistor 52. In other words, induced across current detecting resistor 52 is detected voltage $V_{DT}$ which fluctuates in proportion to changing level of current detected by current detection transformer 51 relative to the reference potential of ground zero volt as shown in FIG. 2(A). Detected voltage $V_{DT}$ from current detecting resistor 52 is supplied to inverted input terminal − of second comparator 57 which then compares detected voltage $V_{DT}$ with bias voltage $V_{BS2}$ of second DC bias power supply 54 applied to non-inverted input terminal + of second comparator 57. When detected voltage $V_{DT}$ on current detecting resistor 52 declines below bias voltage $V_{BS2}$ of second DC bias power supply 54 as shown in FIG. 2(A), second comparator 57 produces a second synchronous drive pulse signal $V_{SC2}$ of high voltage level shown in FIG. 2(B) to gate terminal of second rectifying MOS-FET 8 through second buffer amplifier 58 to turn second rectifying MOS-FET 8 on. Accordingly, an electric current $I_{S2}$ substantially similar to the foregoing resonance current flows from second winding 4c of transformer 4 through a parallel circuit of second output rectifying diode 10 and second rectifying MOS-FET 8 and output smoothing capacitor 11 to an electric load not shown.

When second main MOS-FET 3 is turned off while electric current $I_{Q2}$ flows, voltages $V_{Q1}$ between drain and source terminals of first main MOS-FET 2 and $V_{Q2}$ between drain and source terminals of second main MOS-FET 3 come to pseudo resonance voltage of resonance frequency determined by capacitance of voltage pseudo resonance capacitor 6 and composite inductance of excitation inductance not shown and leakage inductance 4e of transformer 4. At the same time, excitation current flowing through second main MOS-FET 3 and primary winding 4a of transformer 4, is diverted toward and through a parasitic diode not shown connected between drain and source terminals of first main MOS-FET 2. When first main MOS-FET 2 is turned on while excitation current is diverted through parasitic diode, excitation current naturally diminishes, and then, the polarity is inverted so that electric current $I_{Q1}$ flows through first main MOS-FET 2. In this case, electric current $I_{Q1}$ flowing in primary side circuit has the adverse polarity to electric current $I_{Q2}$ flowing through second main MOS-FET 3, and provides a composite current of excitation current through primary winding 4a of transformer 4 and resonance current of resonance frequency determined by capacitance of current resonance capacitor 5 and leakage inductance 4e of transformer 4. Electric current $I_{Q1}$ flowing through primary side circuit is detected by current detecting transformer 51, and then converted into voltage $V_{DT}$ corresponding to detected current amount. In other words, developed across current detecting resistor 52 is detected voltage $V_{DT}$ which fluctuates in proportion to changing level of current detected by current detection transformer 51 relative to the reference potential of ground zero volt as shown in FIG. 2(A). Detected voltage $V_{DT}$ from current detecting resistor 52 is supplied to non-inverted input terminal + of first comparator 55 which then compares detected voltage $V_{DT}$ with bias voltage $V_{BS1}$ of first DC bias power supply 53 applied to inverted input terminal − of first comparator 55. When detected voltage $V_{DT}$ on current detecting resistor 52 rises above bias voltage $V_{BS1}$ of first DC bias power supply 53 as shown in FIG. 2(A), first comparator 55 produces a first synchronous drive pulse signal $V_{SC1}$ of high voltage level shown in FIG. 2(C) to gate terminal of first rectifying MOS-FET 7 through first buffer amplifier 56 to turn first rectifying MOS-FET 7 on. Accordingly, an electric current $I_{S1}$, which has the waveform substantially similar to that of the resonance current flows from second winding 4b of transformer 4 through a parallel circuit of first output rectifying diode 9 and first rectifying MOS-FET 7 and output smoothing capacitor 10 to load.

When first main MOS-FET 2 is turned off while electric current $I_{Q1}$ flows, voltages $V_{Q1}$ between drain and source terminals of first main MOS-FET 2 and $V_{Q2}$ between drain and source terminals of second main MOS-FET 3, come to pseudo resonance voltage of resonance frequency determined by capacitance of voltage pseudo resonance capacitor 6 and composite inductance of excitation inductance not shown and leakage inductance 4e of transformer 4. At the same time, excitation current flowing through first main MOS-FET 2 and primary winding 4a of transformer 4, is diverted toward and through a parasitic diode not shown connected between drain and source terminals of second main MOS-FET 3. When second main MOS-FET 3 is turned on while excitation current is diverted through parasitic diode, excitation current naturally diminishes, and then, the polarity is inverted so that electric current $I_{Q2}$ flows through second main MOS-FET 3. Hereafter, the above-mentioned synchronous rectification operation is repeated to supply DC output voltage $V_O$ of substantially constant level to load from secondary side circuit. FIGS. 3(A), 3(B) and 3(C) represent waveforms of respectively voltage $V_{Q1}$ between drain and source terminals of first main MOS-FET 2, electric current $I_{Q1}$ flowing through first main MOS-FET 2 and electric current $I_{S1}$ through secondary winding 4b of transformer 4.

In the first embodiment, current detecting transformer 51 detects electric currents $I_{Q1}$ and $I_{Q2}$ flowing through primary side circuit of transformer 4, and when detected voltage $V_{DT}$ by current detecting resistor 52 exceeds bias voltage $V_{BS1}$ or $V_{BS2}$ of first or second DC bias power supply 53 or 54 higher than voltage corresponding to excitation current through transformer 4, first or second comparator 55 or 57 produces first or second synchronous drive pulse signal $V_{SC1}$ or $V_{SC2}$ of high voltage level which turns first or second rectifying MOS-FET 7 or 8 on. Thus, first and second rectifying MOS-FETs 7 and 8 can be turned on or driven synchronously with electric currents $I_{Q1}$ and $I_{Q2}$ flowing in primary side circuit without excitation current component through transformer 4 and also simultaneously commensurately with rectified output currents $I_{S1}$ and $I_{S2}$ flowing in secondary side circuit to avoid power loss resulted from undesirable circulating current. This assures that the DC-DC converter of synchronous rectification type can control and minimize power loss caused by operation of first and second rectifying MOS-FETs 7 and 8 in secondary side circuit to improve the conversion efficiency. Also, to accomplish current resonance action, the converter can limit voltage borne on first and second rectifying MOS-FETs 7 and 8 twice or less DC output voltage $V_O$ applied on load because DC output voltage $V_O$ and superimposed voltage on secondary winding 4b or 4c may simultaneously be applied on each of first and second rectifying MOS-FETs 7 and 8. Accordingly, adopting MOS-FETs of lower withstand voltage and lower impedance during the on-period, the embodiment can provide an inexpensive DC-DC converter of synchronous rectification type having the extremely high conversion efficiency.

Figure 4:
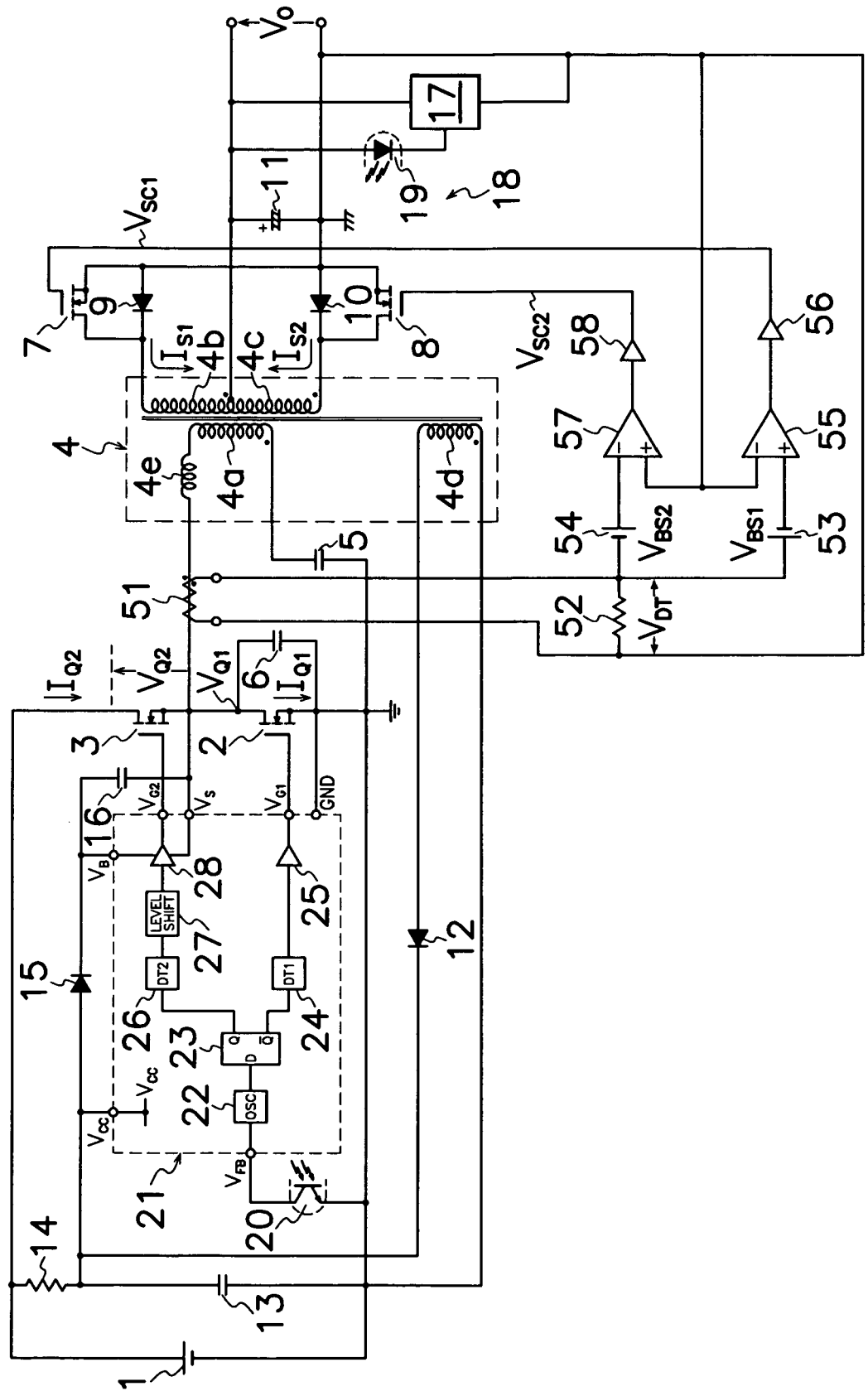
FIG. 4 is an electric circuit diagram indicating a modified embodiment from the DC-DC converter of synchronous rectification type shown in FIG. 1.
Figure 5:
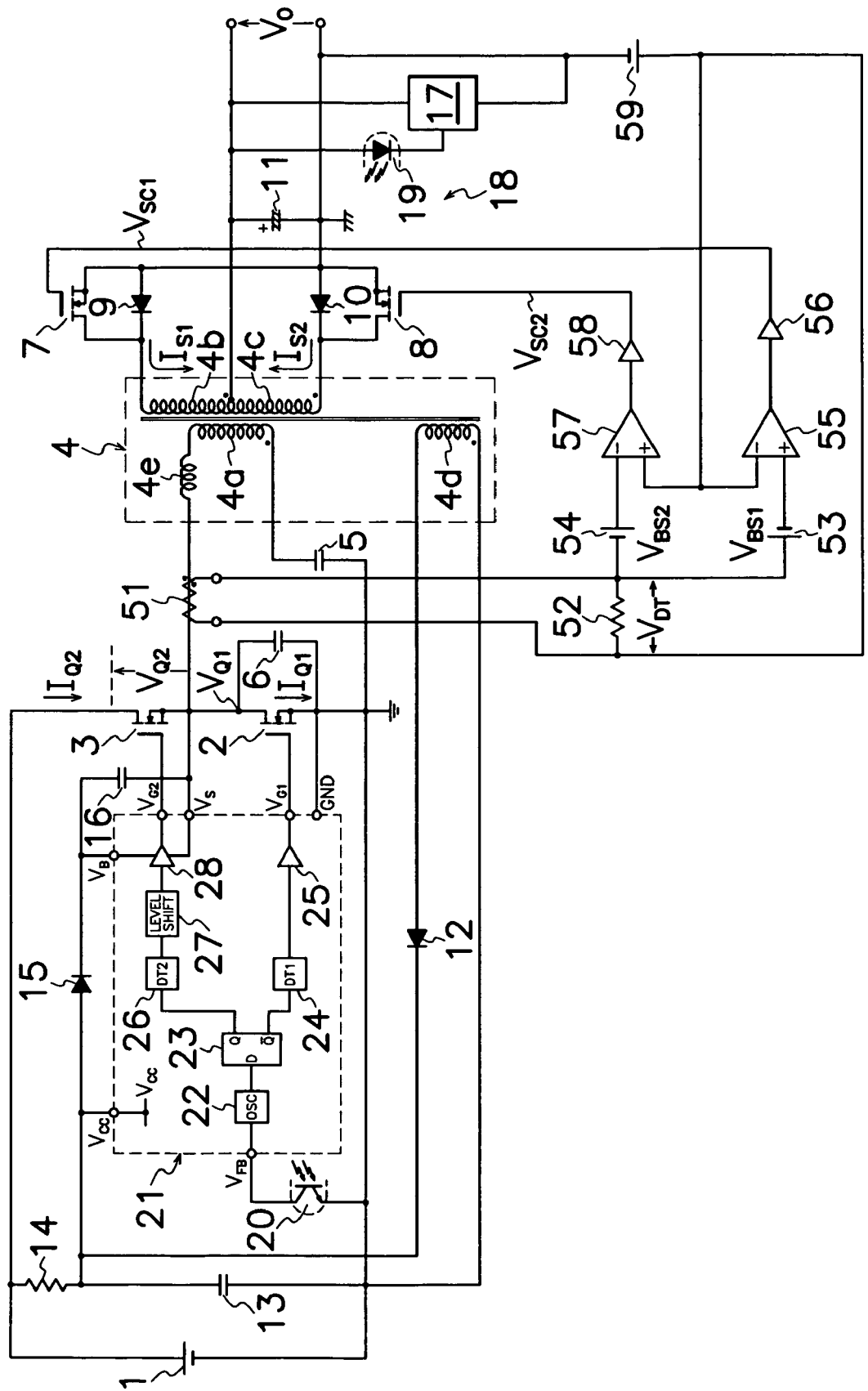
FIG. 5 is an electric circuit diagram indicating a modified embodiment from the DC-DC converter of synchronous rectification type shown in FIG. 4.

The converter shown in FIG. 1 includes first and second comparators 55 and 57 for comparing detected voltage $V_{DT}$ on current detecting resistor 52 with bias voltages $V_{BS1}$ and $V_{BS2}$ by first and second DC biasing power supplies 53 and 54. An alternative of the converter is shown in FIG. 4 wherein first and second DC biasing power supplies 53 and 54 are connected in series respectively between current detecting resistor 52 and first comparator 55 and between current detecting resistor 52 and second comparator 57; detected voltage $V_{DT}$ from current detecting resistor 52 may be shifted to a negative side by bias voltage $V_{BS1}$ of first DC bias power supply 53 and also to a positive side by bias voltage $V_{BS2}$ of second DC bias power supply 54 to compare shifted voltage $V_{DT}$ with ground zero volt in first and second comparators 55 and 57. In the DC-DC converter of synchronous rectification type shown in FIGS. 1 and 4, first and second comparators 55 and 57 are driven by two power supplies 53 and 54 for respectively generating negative and positive outputs, however, in most practical cases, they are driven by a power supply for generating a single output. In this view, it would be advisable to connect a further bias power supply 59 to each reference voltage input terminal of first and second comparators 55 and 57 as shown in FIG. 5 to shift reference voltage above ground zero volt by further bias power supply 59 and up to a level that does not exceed any either allowable input voltage limitation of first and second comparators 55 and 57. Functions and effects performed in either of the embodiments shown in FIGS. 4 and 5 are essentially similar to those effected in the circuit shown in FIG. 1.

The first embodiment may be modified in various ways. For example, in a second embodiment of the present invention illustrated in FIG. 6, the DC-DC converter of synchronous rectification type comprises, in addition to the converter shown in FIG. 1, an operational amplifier 60 as a synchronizing signal generator for producing pulse signals $V_{PL}$ synchronizing with frequency of voltage generated in secondary winding 4c of transformer 4; and a resistor 61 and an integral capacitor 62 incorporated to form an integration circuit together for generating a ramp signal $V_{RP}$ whose inclination is inverted every half cycle of pulse signal $V_{PL}$ from operational amplifier 60 wherein a junction of resistor 61 and integral capacitor 62 is connected to a junction of negative terminal of first DC bias power supply 53 and positive terminal of second DC bias power supply 54. Inverted and non-inverted input terminals − and + of operational amplifier 60 are connected respectively to ground in secondary side circuit and secondary winding 4c of transformer 4. In operation, operational amplifier 60 produces rectangular pulse signals $V_{PL}$ of the alternating polarity shown in FIG. 7(B) with frequency of voltage produced on secondary winding 4c of transformer 4 so that pulse signals $V_{PL}$ from operational amplifier 60 are supplied to integral capacitor 62 through resistor 61 to charge and discharge integral capacitor 62 with a time constant determined by the product of a resistance value of resistor 61 and capacitance of integral capacitor 62. Accordingly, integral capacitor 62 produces at a junction of resistor 61 and integral capacitor 62 ramp signals $V_{RP}$ shown in FIG. 7(C) synchronizing with frequency of voltage developed on secondary winding 4c of transformer 4. Thus, operational amplifier 60, resistor 61 and integral capacitor 62 provide a ramp signal generator for producing ramp signals $V_{RP}$ proportional to voltage corresponding to excitation current flowing through primary winding 4a of transformer 4. Other components in FIG. 6 are substantially similar to those in the converter shown in FIG. 1.

Figure 6:
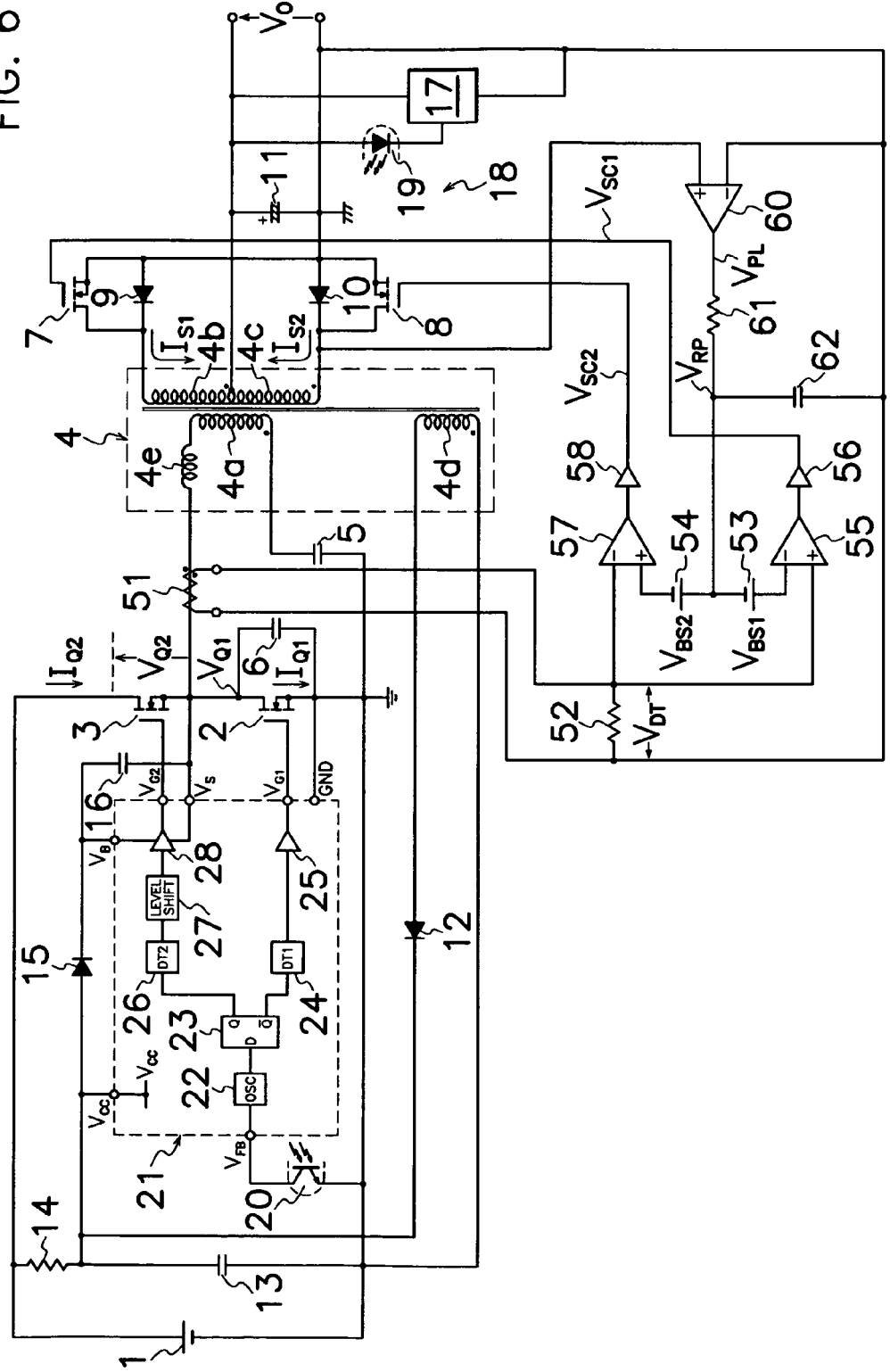
FIG. 6 is an electric circuit diagram indicating a second embodiment of the DC-DC converter of synchronous rectification type according to the present invention.
Figure 7:
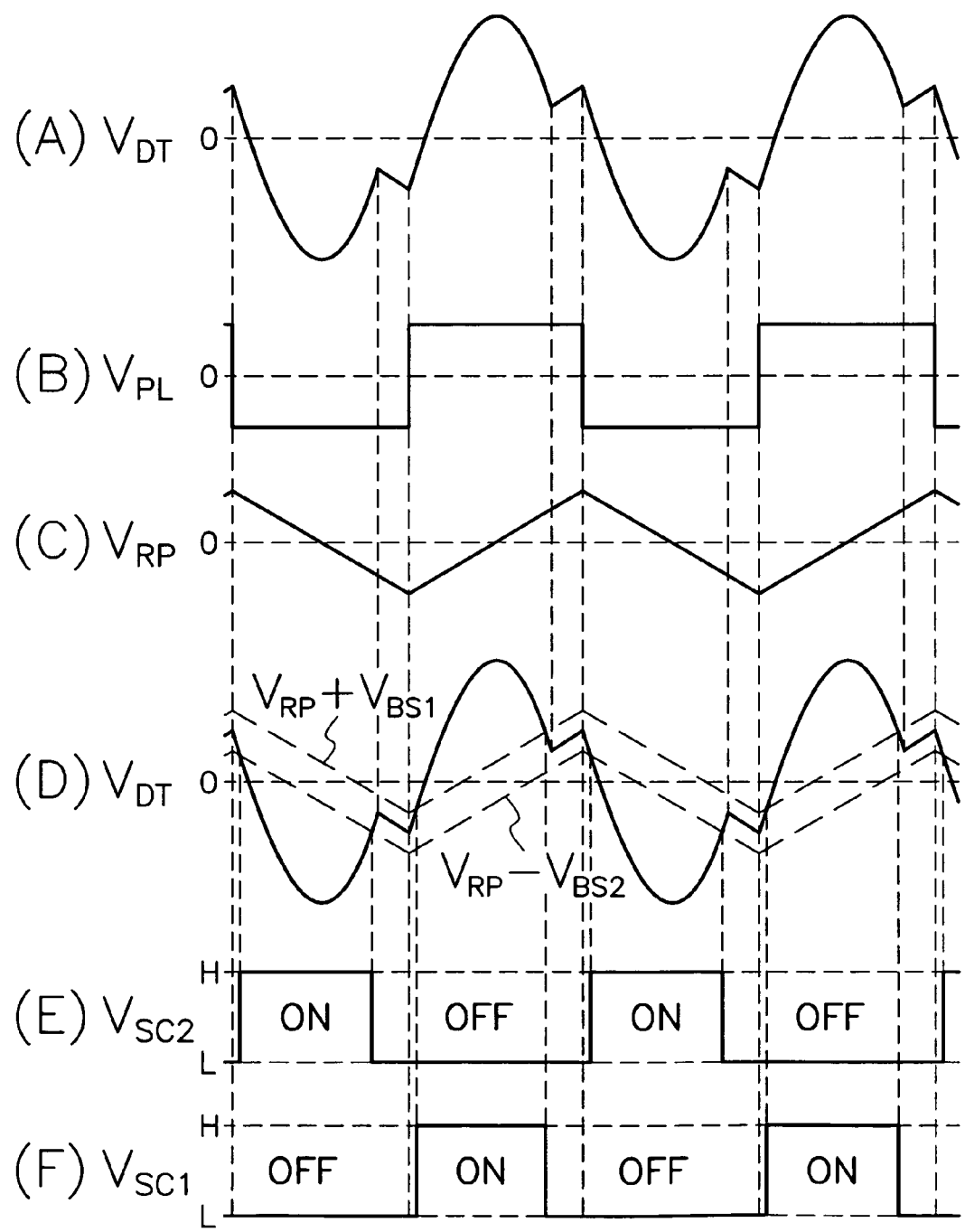
FIG. 7 is a time chart of waveforms of voltages at selected locations in FIG. 6.

In the circuit shown in FIG. 6, current detecting transformer 51 detects electric current $I_{Q2}$ flowing through primary side circuit when second main MOS-FET 3 is turned on, and then current detecting resistor 52 converts detected electric current $I_{Q2}$ into voltage $V_{DT}$ relative thereto produced across detecting resistor 52 so that detected voltage $V_{DT}$ fluctuates across reference potential of ground zero volt in proportion to electric current detected by current detecting transformer 51. Detected voltage $V_{DT}$ is applied to inverted input terminal − of second comparator 57 which compares detected voltage $V_{DT}$ with superimposed signal $V_{RP}-V_{BS2}$ because non-inverted input terminal + of second comparator 57 concurrently receives ramp signal $V_{RP}$ shown in FIG. 7(C) from integral capacitor 62 and bias voltage $-V_{BS2}$ from second DC bias power supply 54. In detail, non-inverted input terminal + of second comparator 57 acquires composite voltage $V_{RP}-V_{BS2}$ shown in FIG. 7(D) because ramp signal voltage $V_{RP}$ on integral capacitor 62 is shifted to negative side by bias voltage $V_{BS2}$ of second DC bias power supply 54. When detected voltage $V_{DT}$ on current detecting resistor 52 decreases below composite voltage $V_{RP}-V_{BS2}$ as shown in FIG. 7(D), second comparator 57 produces second synchronous drive pulse signals $V_{SC2}$ of high voltage level to gate terminal of second rectifying MOS-FET 8 through second buffer amplifier 58 to turn second rectifying MOS-FET 8 on.

Meanwhile, current detecting transformer 51 detects electric current $I_{Q1}$ flowing through primary side circuit when first main MOS-FET 2 is turned on, and current detecting resistor 52 converts the detected current into commensurate voltage $V_{DT}$. At this moment, developed across current detecting resistor 52 is voltage $V_{DT}$ shown in FIG. 7(A) which moves proportionately to level of current detected by current detecting transformer 51 across reference potential of ground zero volt. Voltage $V_{DT}$ on current detecting resistor 52 is applied to non-inverted input terminal + of first comparator 55 which compares detected voltage $V_{DT}$ with superimposed signal $V_{RP}+V_{BS1}$ because inverted input terminal − of first comparator 55 concurrently receives ramp signal $V_{RP}$ shown in FIG. 7(C) from integral capacitor 62 and bias voltage $V_{BS1}$ from first DC bias power supply 53. In detail, inverted input terminal − of first comparator 55 acquires composite voltage $V_{RP}+V_{BS1}$ shown in FIG. 7(D) because ramp signal voltage $V_{RP}$ on integral capacitor 62 is shifted to positive side by bias voltage $V_{BS1}$ of first DC bias power supply 53. When detected voltage $V_{DT}$ on current detecting resistor 52 increases above composite voltage $V_{RP}+V_{BS1}$ as shown in FIG. 7(D), first comparator 55 produces first synchronous drive pulse signals $V_{SC1}$ of high voltage level to gate terminal of first rectifying MOS-FET 7 through first buffer amplifier 56 to turn first rectifying MOS-FET 7 on. Other operations of main circuits in the DC-DC converter of synchronous rectification type shown in FIG. 6 than the aforesaid operation is substantially similar to those in the DC-DC converter shown in FIG. 1, and further detailed description on other operations is omitted.

In the second embodiment, voltage waveform of ramp signal $V_{RP}$ appearing at junction between resistor 61 and integral capacitor 62 is approximately similar to waveform of excitation current flowing through primary winding 4a of transformer 4. Accordingly, superimposed ramp signal $V_{RP}$, bias voltages $V_{BS1}$ and $V_{BS2}$ cooperate to form between $V_{RP}-V_{BS2}$ and $V_{RP}+V_{BS1}$ an insensible area where first and second comparators 55 and 57 do not respond to detected voltage $V_{DT}$ to cancel or offset excitation current component contained in electric currents $I_{Q1}$ and $I_{Q2}$ through transformer 4 in primary side circuit when current detecting transformer 51 detects excitation current component. This enables the converter to turn first and second rectifying MOS-FETs 7 and 8 on in secondary side circuit synchronously with only resonance current component in electric currents $I_{Q1}$ and $I_{Q2}$ flowing through primary side circuit. In other words, first and second rectifying MOS-FETs 7 and 8 can efficiently be driven accurately in proportion to rectified output current $I_{S1}$ and $I_{S2}$ flowing through secondary side circuit. Also, as first and second DC biasing power supplies 53 and 54 may be of any optional bias voltage generators capable of producing bias voltages $V_{BS1}$ and $V_{BS2}$ for covering a electric current range lower than excitation current component through transformer 4, it is advantageous to adopt lower biased voltage than that in the first embodiment. Not shown, but the second embodiment may be modified in substantially similar manners as in the first embodiments shown in FIGS. 4 and 5.

Figure 8:
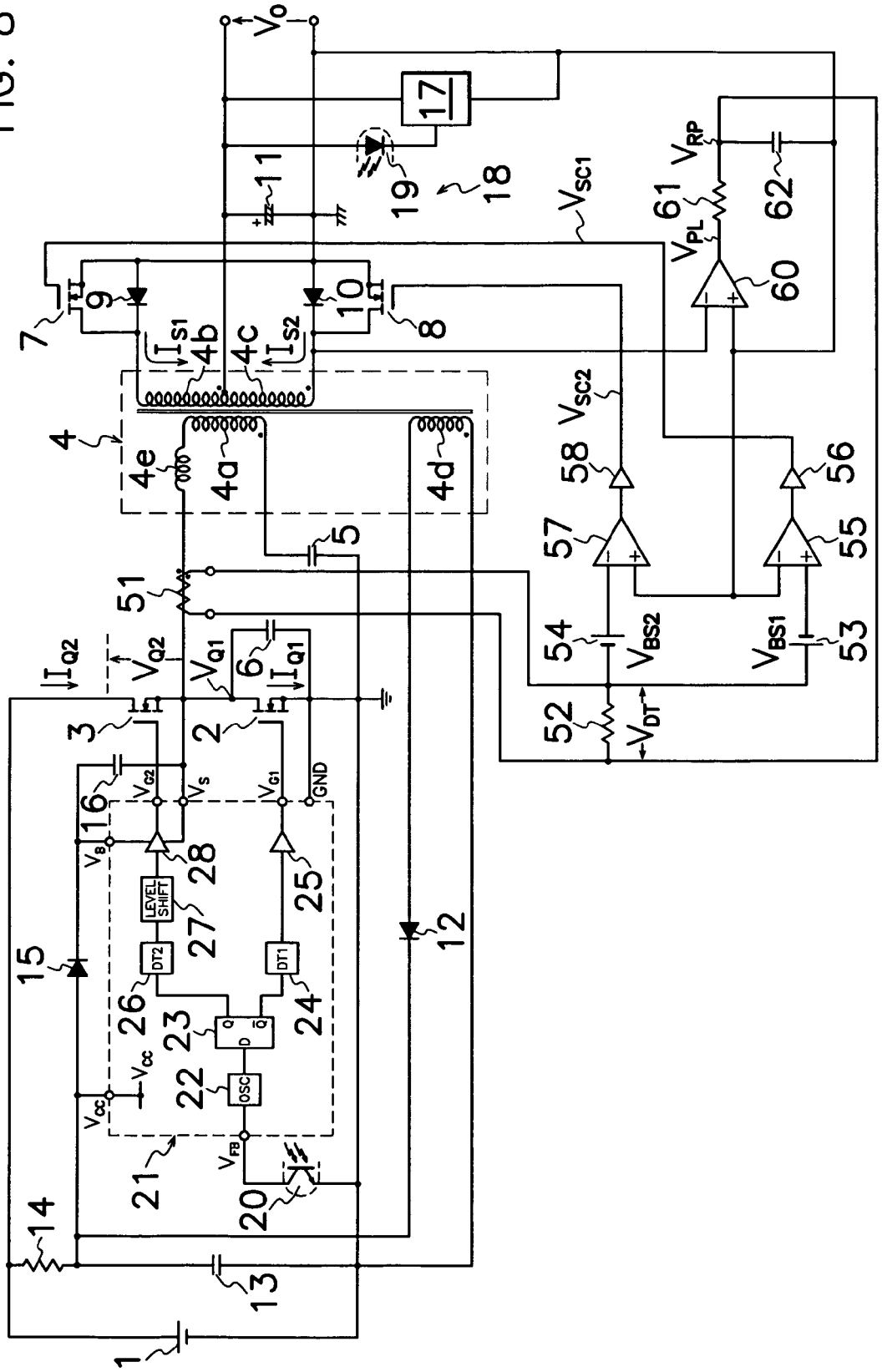
FIG. 8 is an electric circuit diagram indicating a third embodiment of the DC-DC converter of synchronous rectification type according to the present invention.
Figure 9:
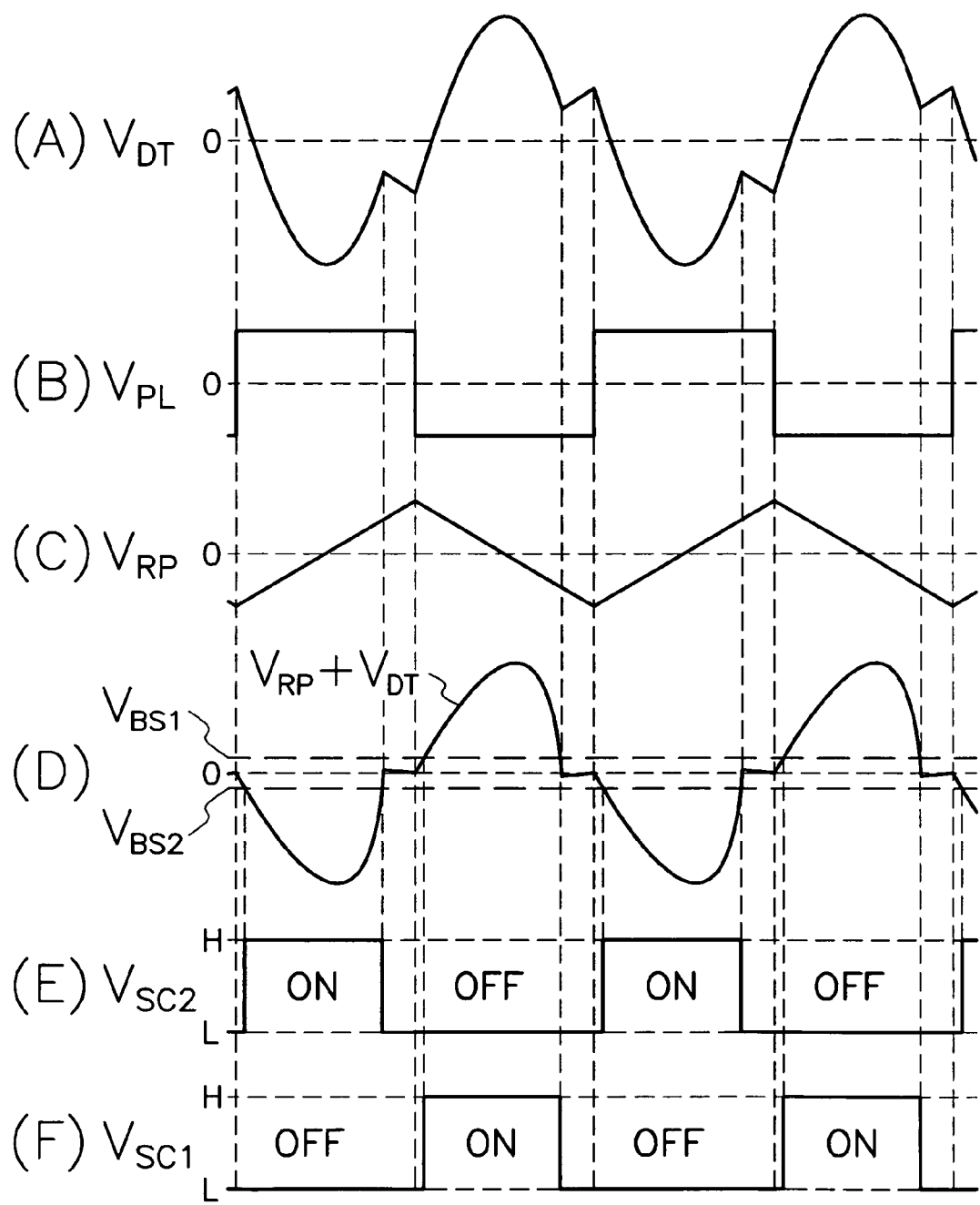
FIG. 9 is a time chart of waveforms of voltages at selected locations in FIG. 8.

A third embodiment of the DC-DC converter of synchronous rectification type shown in FIG. 8, comprises, in addition to the converter shown in FIG. 4, an operational amplifier 60 as a synchronous signal generator for producing pulse signals $V_{PL}$ synchronously with frequency of voltage produced in secondary winding 4c of transformer 4; and an integration circuit of a resistor 61 and integral capacitor 62 for producing ramp signals $V_{RP}$ whose inclination is inverted every half cycle of pulse signal $V_{PL}$ from operational amplifier 60 wherein a junction of resistor 61 and integral capacitor 62 is connected to a reference potential side (the left end in FIG. 8) of current detecting resistor 52. Inverted and non-inverted input terminals − and + of operational amplifier 60 are connected respectively to secondary winding 4c of transformer 4 and ground in secondary side circuit. In operation, operational amplifier 60 produces rectangular pulse signals $V_{PL}$ of the alternating polarity shown in FIG. 9(B) with frequency of voltage produced on secondary winding 4c of transformer 4 so that pulse signals $V_{PL}$ from operational amplifier 60 are supplied to integral capacitor 62 through resistor 61 to charge and discharge integral capacitor 62 with a time constant determined by the product of a resistance value of resistor 61 and capacitance of integral capacitor 62. Accordingly, integral capacitor 62 produces at a junction of resistor 61 and integral capacitor 62 ramp signals $V_{RP}$ shown in FIG. 9(C) synchronizing with frequency of voltage developed on secondary winding 4c of transformer 4. Thus, operational amplifier 60, resistor 61 and integral capacitor 62 provide a ramp signal generator for producing ramp signals $V_{RP}$ proportional to voltage corresponding to excitation current flowing through primary winding 4a of transformer. Other components in FIG. 8 are substantially similar to those in the converter shown in FIG. 4.

In the circuit shown in FIG. 8, current detecting transformer 51 detects electric current $I_{Q2}$ flowing through primary side circuit when second main MOS-FET 3 is turned on, and then current detecting resistor 52 converts detected electric current $I_{Q2}$ into voltage $V_{DT}$ relative thereto produced across detecting resistor 52. In this case, detected voltage $V_{DT}$ across current detecting resistor 52 fluctuates in proportion to electric current detected by current detecting transformer 51 over reference potential of ramp signal $V_{RP}$ voltage on integral capacitor 62. Specifically, there is produced a superimposed signal $V_{RP}+V_{DT}$ shown in FIG. 9(D) at detection potential side (right side end in FIG. 8) of current detecting resistor 52 since ramp signal $V_{RP}$ shown in FIG. 9(C) on integral capacitor 62 is applied on the left end of current detecting resistor 52 which simultaneously detects the voltage $V_{DT}$ shown in FIG. 9(A). Composite voltage $V_{RP}+V_{DT}$ on detecting potential side of current detecting resistor 52 is applied to an inverted input terminal − of second comparator 57 through second DC bias power supply 54 so that inverted input terminal − of second comparator 57 receives composite voltage $V_{RP}+V_{DT}$ shifted to positive side by bias voltage $V_{BS2}$ of second DC bias power supply 54. In other words, as shown in FIG. 9(D), second comparator 57 compares composite voltage $V_{RP}+V_{DT}$ on detection potential side of current detecting resistor 52 with bias voltage $V_{BS}$ of second DC bias power supply 54 relatively shifted to negative side. When composite voltage $V_{RP}+V_{DT}$ drops below bias voltage $V_{BS2}$ of second DC bias power supply 54 as shown in FIG. 9(D), second comparator 57 produces second synchronous drive pulse signals $V_{SC2}$ of high voltage level shown in FIG. 9(E) to gate terminal of second rectifying MOS-FET 8 through second buffer amplifier 58 to turn second rectifying MOS-FET 8 on.

On the other hand, current detecting transformer 51 detects electric current $I_{Q1}$ flowing through primary side circuit when first main MOS-FET 2 is turned on, and current detecting resistor 50 converts detected electric current $I_{Q1}$ into voltage $V_{DT}$ equivalent thereto. At the moment, produced across current detecting resistor 52 is detected voltage which fluctuates proportionately to amount of detected current by current detecting transformer 51 over reference potential of ramp signal $V_{RP}$ voltage on integral capacitor 62. Specifically, composite voltage $V_{RP}+V_{DT}$ shown in FIG. 9(D) appears at detection potential end (right side end in FIG. 8) of current detecting resistor 52 because integral capacitor 62 retains ramp signal $V_{RP}$ voltage shown in FIG. 9(C) and coincidentally current detecting resistor 52 picks out detected voltage $V_{DT}$ shown in FIG. 9(A). Then, composite voltage $V_{RP}+V_{DT}$ on detection potential end of current detecting resistor 52 is applied through first DC bias power supply 53 to non-inverted input terminal + of first comparator 55 which compares composite voltage $V_{RP}+V_{DT}$ with ground zero volt applied to inverted input terminal − of first comparator 55. In other words, non-inverted input terminal + of first comparator 55 receives composite voltage $V_{RP}+V_{DT}$ moved to negative side by biasing voltage $V_{BS1}$ of first DC bias power supply 53 so that, as shown in FIG. 9(D), first comparator 55 compares composite voltage $V_{RP}+V_{DT}$ with biasing voltage $V_{BS1}$ of first DC bias power supply 53. When composite voltage $V_{RP}+V_{DT}$ rises over biasing voltage $V_{BS1}$ of first DC bias power supply 53 as shown in FIG. 9(D), first comparator 55 produces first synchronous drive pulse signal $V_{SC1}$ through first buffer amplifier 56 to gate terminal of first rectifying MOS-FET 7 to turn first rectifying MOS-FET 7 on. Other basic operations in the DC-DC converter of synchronous rectification type shown in FIG. 8 than the aforesaid operation are substantially similar to those in the DC-DC converter shown in FIG. 1, and further detailed description on other operations is omitted.

Figure 10:
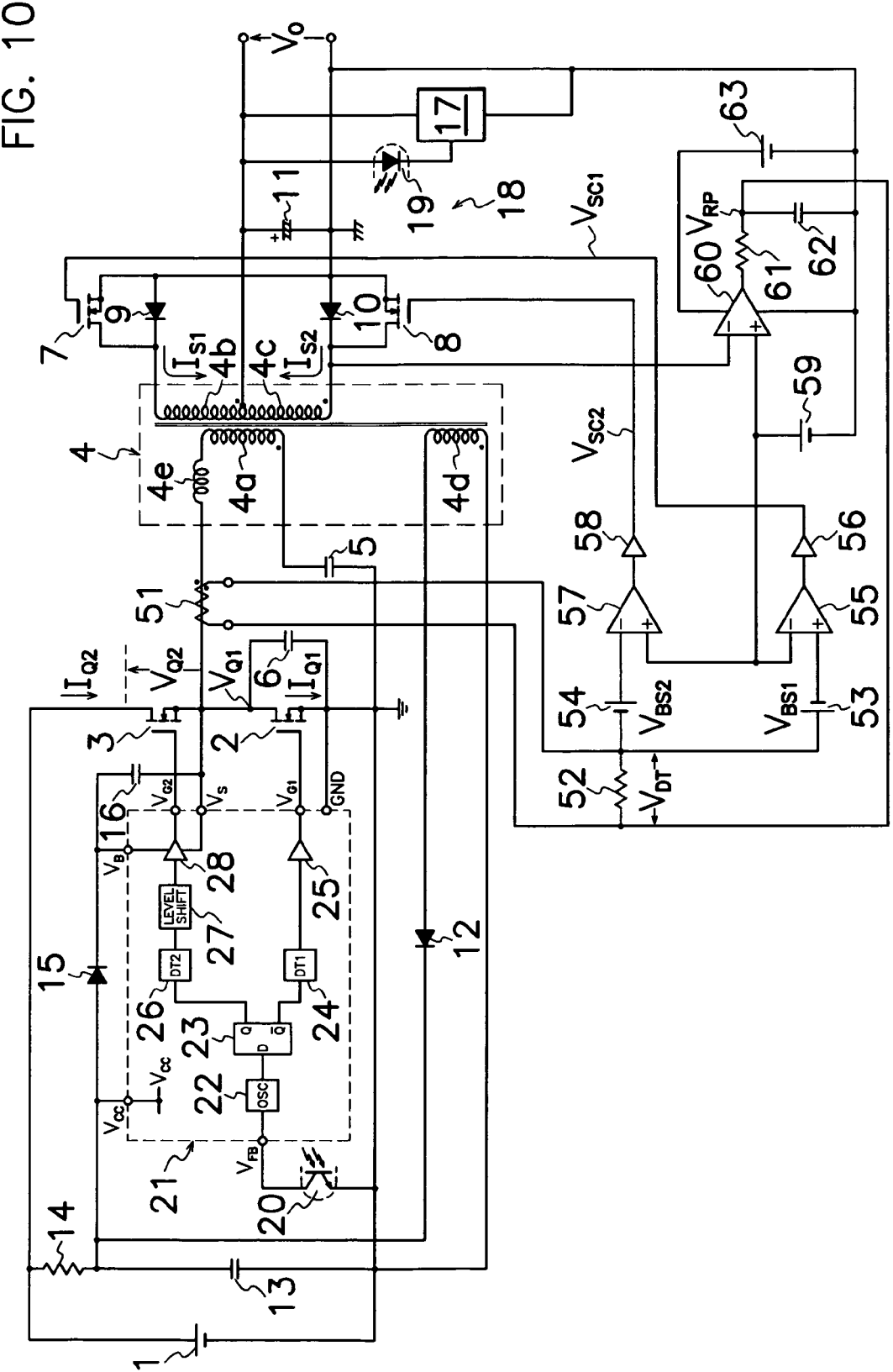
FIG. 10 is an electric circuit diagram indicating a modified embodiment from the DC-DC converter of synchronous rectification type shown in FIG. 8.

In the third embodiment of the present invention, as ramp signals $V_{RP}$ on integral capacitor 62 has the substantially similar voltage waveform to that of excitation current flowing through primary winding 4a of transformer 4, ramp signals $V_{RP}$ can cancel or offset excitation current component contained in electric current $I_{Q1}$, $I_{Q2}$ in primary side circuit detected by current detector 51 by comparing composite signal $V_{RP}+V_{DT}$ with biasing voltages $V_{BS1}$ and $V_{BS2}$ of first and second DC biasing power supplies 53 and 54. Accordingly, first and second rectifying MOS-FETs 7 and 8 can efficiently be turned on synchronously with resonance current component only in electric currents $I_{Q1}$ and $I_{Q2}$ flowing in primary side circuit and exactly in proportion to rectified output currents $I_{S1}$ and $I_{S2}$ flowing through secondary side circuit. Also, as first and second DC biasing power supplies 53 and 54 may be of any optional bias voltage generators capable of producing bias voltages $V_{BS1}$ and $V_{BS2}$ for covering a electric current range lower than excitation current component through transformer 4, it is advantageous to adopt lower biased voltage than that in the first embodiment. The third embodiment may be modified in substantially similar manners as in the first embodiment shown in FIG. 5. Specifically, when first and second comparators 55 and 57 are driven with a power supply for producing a single output, a separate bias power supply 59 shown in FIG. 10 is connected to each input terminal for reference voltage of first and second comparators 55 and 57 to bias ground zero volt of reference potential to positive side by power supply 59 and up to a level that does not exceed any either allowable input voltage limitation of first and second comparators 55 and 57. In the circuit shown in FIG. 10, operational amplifier 60 as a ramp signal generator is driven by an additional drive power supply 63. Not shown, but first and second DC biasing power supplies 53 and 54 may be connected in a similar circuit configuration to that shown in FIG. 1.

Figure 11:
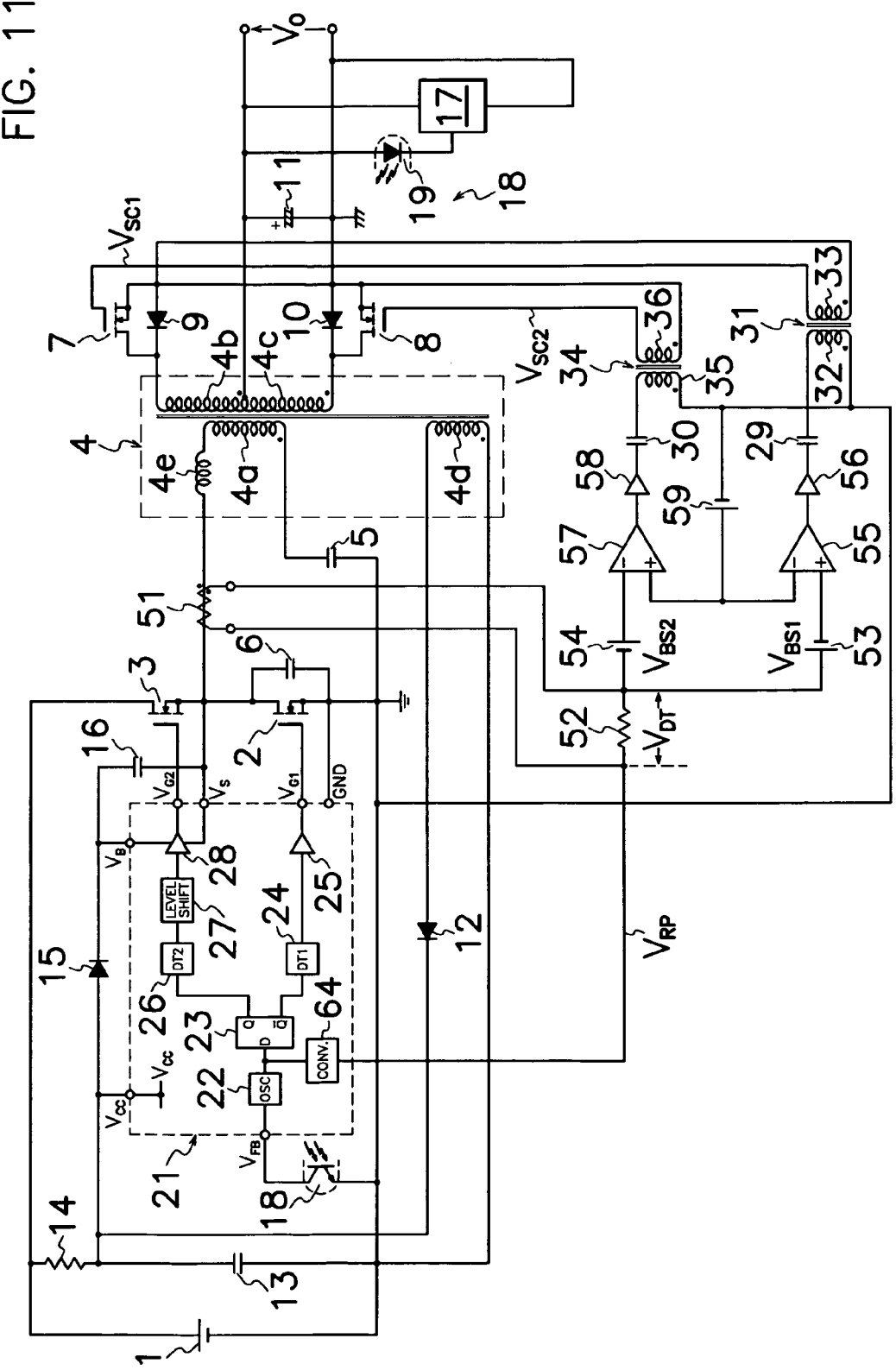
FIG. 11 is an electric circuit diagram indicating a fourth embodiment of the DC-DC converter of synchronous rectification type according to the present invention.

In lieu of operational amplifier 60, resistor 61 and integral capacitor 62 shown in FIG. 8, a fourth embodiment of the DC-DC converter of synchronous rectification type shown in FIG. 11, comprises a waveform shaper 64 as waveform shaping means for converting pulse signals generated from an oscillator 22 in control circuit 21 into ramp signals $V_{RP}$ whose inclination is inverted every half cycle of pulse signals. An output terminal of waveform shaper 64 is connected to reference potential side of current detecting resistor 52, and first and second buffer amplifiers 56 and 58 issue output signals $V_{SC1}$ and $V_{SC2}$ through first and second capacitors 29 and 30 and first and second pulse transformers 31 and 34 to each gate terminal of first and second rectifying MOS-FETs 7 and 8. Also, connected between each input terminal for reference voltage of first and second comparators 55 and 57 and ground in primary side circuit of the converter shown in FIG. 11 is a bias power supply 59 for driving first and second comparators 55 and 57 with bias power supply 59 for producing a single output. Other components than the foregoing are substantially similar to those in the converter shown in FIG. 8. As primary and secondary side circuits of transformer 4 are electrically insulated from each other by virtue of first and second pulse transformers 31 and 34 in the fourth embodiment, it is advantageous that mutual interference hardly occurs between primary and secondary side circuits. Operations of the converter shown in FIG. 11 are substantially similar to those shown in FIG. 8, and detailed description thereon is omitted.

Figure 12:
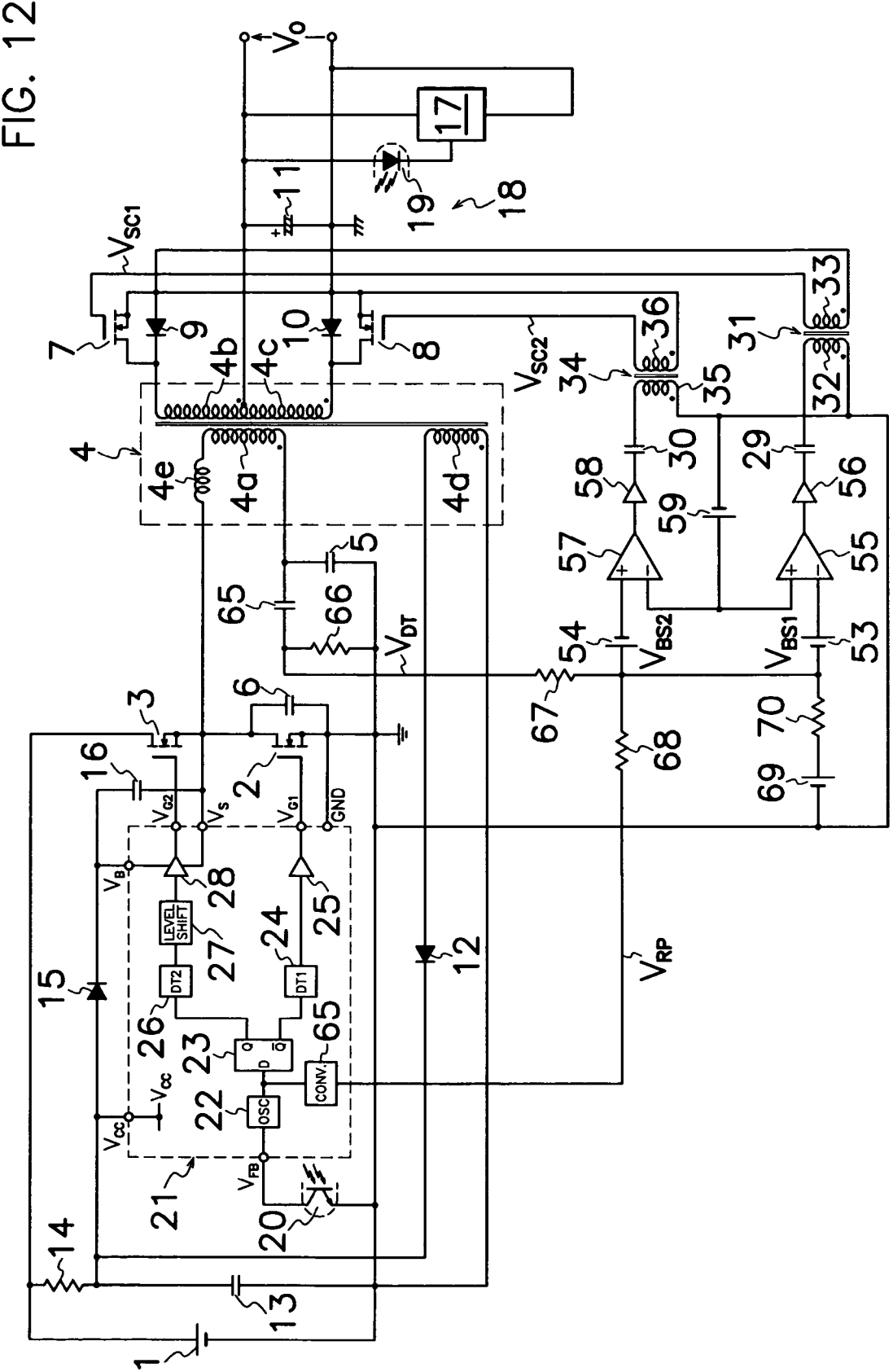
FIG. 12 is an electric circuit diagram indicating a fifth embodiment of the DC-DC converter of synchronous rectification type according to the present invention.

In lieu of current detecting transformer 51 shown in FIG. 11, a fifth embodiment of the DC-DC converter of synchronous rectification type shown in FIG. 12 comprises a shunt capacitor 65 and a transfer resistor 66 connected in series and in parallel to current resonance capacitor 5; and a resistor 67 connected between a junction of shunt capacitor 65 and transfer resistor 66 and a junction of first and second DC biasing power supplies 53 and 54 wherein shunt capacitor 65, transfer resistor 66 and resistor 67 cooperate to form a current detector. The converter further comprises a resistor 68 connected between waveform shaper 64 and junction of first and second DC biasing power supplies 53 and 54; and a bias power supply 69 and a resistor 70 connected in series between a junction of first and second DC biasing power supplies 53 and 54 and ground in primary side circuit wherein first and second DC biasing power supplies 53 and 54 are connected with adverse polarities to each other; and inverted and non-inverted input terminals − and + are replaced in first and second comparators 55 and 57. Other components than the above components are substantially similar to those in the converter shown in FIG. 11. In the fifth embodiment, when electric current flows through current resonance capacitor 5 in primary side circuit, a minor divided current flows through shunt capacitor 65 so that transfer resistor 66 converts divided current into a relative voltage which are in turn superimposed first and second DC biasing power supplies 53 and 54 through resistor 67. Accordingly, the converter of FIG. 12 is beneficial in that it can be made with more inexpensive capacitors and resistors for current detector than current detecting transformer 51 shown in FIG. 11, and that electric currents $I_{Q1}$ and $I_{Q2}$ flowing through primary side circuit can efficiently be sensed with lesser power loss. Operations of the converter shown in FIG. 12 are essentially similar to those of the converter shown in FIG. 8, and detailed explanation is omitted.

Figure 13:
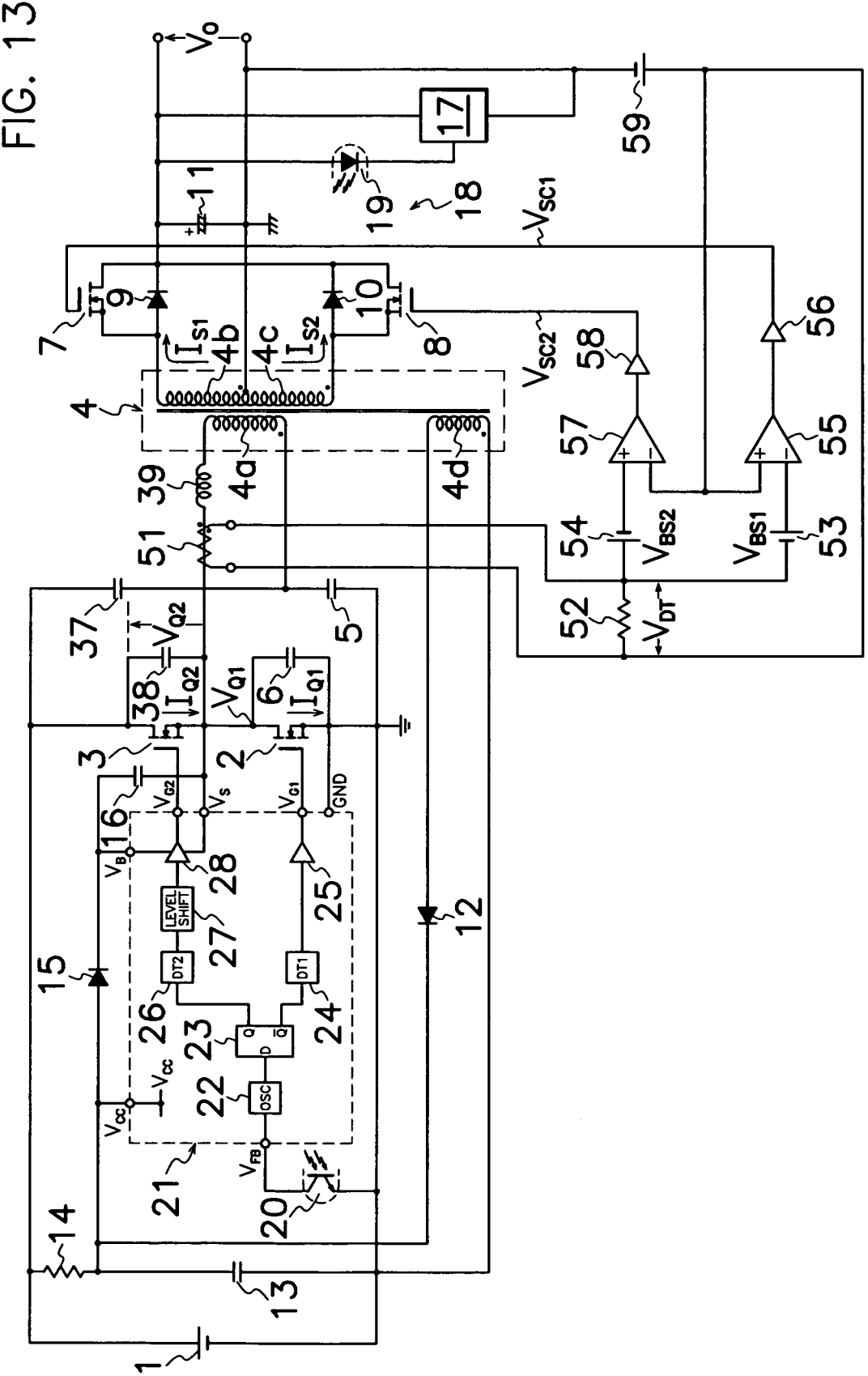
FIG. 13 is an electric circuit diagram indicating a modified embodiment of the DC-DC converter of synchronous rectification type according to the present invention.

Embodiments of the present invention may be modified and varied in further various ways without limitation to the foregoing five embodiments. By way of example, the converter shown in FIG. 5 can be redesigned as illustrated in FIG. 13 exhibiting a DC-DC converter of synchronous rectification type which comprises an additional current resonance capacitor 37 connected between a junction of current resonance capacitor 5 and primary winding 4a of transformer 4 and drain terminal of second main MOS-FET 3; an additional voltage pseudo resonance capacitor 38 connected between drain and source terminals of second main MOS-FET 3; and an external current resonance reactor or coil 39 connected in series to primary winding 4a, in place of leakage inductance 4e of transformer 4 as a current resonance reactor in FIG. 1 wherein connection of first and second rectifying MOS-FETs 7 and 8 is changed from negative output terminal to positive output terminal; first and second DC biasing power supplies 53 and 54 are connected with the adverse polarities; and inverted and non-inverted input terminals − and + are replaced in first and second comparators 55 and 57. Operations of the converter shown in FIG. 13 are substantially similar to those in the converter shown in FIG. 5 except the differences that the on-periods of first and second synchronous drive pulse signals $V_{SC1}$ and $V_{SC2}$ are changed with each other and levels of the drive circuits are different each other because rectified output currents $I_{S1}$ and $I_{S2}$ flows in secondary side circuit in the opposite directions from those in FIG. 5. Accordingly, the converter shown in FIG. 13 can produce substantially similar functions and effects as those obtained in the first embodiment. Also, same or similar modifications to those above-mentioned can be made to first embodiments of the invention shown in FIGS. 1 and 4 and to second to fifth embodiments of the invention. In addition, in lieu of first and second output rectifying diodes 9 and 10 in secondary side circuit, each of first to fifth embodiments may utilize diodes integrated in first and second rectifying MOS-FETs 7 and 8 between drain and source terminals. Moreover, each of first to fifth embodiments may be of full-bridge type, push-pull type or forward type in primary side circuit of transformer in place of half-bridge type. Also, secondary side circuit of transformer 4 may utilize a half-wave rectifying circuit.

INDUSTRIAL APPLICABILITY

The present invention is in particular effectively applicable to current resonant DC-DC converter of synchronous rectification type.

What is claimed are:

1. A DC-DC converter of synchronous rectification type comprising at least one main switching element and a primary winding of a transformer for forming a primary side circuit connected to a DC power source;
   at least one rectifying switching element for forming a secondary side circuit connected between an electric load and a secondary winding electromagnetically coupled to said primary winding of said transformer to drive said rectifying switching element synchronously with the switching operation of said main switching element in order to supply DC output through said secondary side circuit to said load;
   a current detector for detecting electric current flowing through said primary side circuit;
   biasing means for producing a greater bias voltage than voltage corresponding to excitation current through said transformer; and a comparator for driving said rectifying switching element when detected voltage by current detector exceeds the biased voltage by said biasing means.

2. A DC-DC converter of synchronous rectification type comprising at least one main switching element and a primary winding of a transformer for forming a primary side circuit connected to a DC power source;
- at least one rectifying switching element for forming a secondary side circuit connected between an electric load and a secondary winding electromagnetically coupled to said primary winding of said transformer to drive said rectifying switching element synchronously with the switching operation of said main switching element in order to supply DC output through said secondary side circuit to said load;
- a current detector for detecting electric current flowing through said primary side circuit;
- biasing means for producing a bias voltage;
- a ramp signal generator for producing ramp signals in proportion to voltage corresponding to excitation current flowing through said transformer; and
- a comparator for driving said rectifying switching element when said detected voltage by said current detector exceeds voltage of superimposed signal of biased voltage and ramp signal of said ramp voltage generator.

3. A DC-DC converter of synchronous rectification type comprising at least one main switching element and a primary winding of a transformer for forming a primary side circuit connected to a DC power source;
- at least one rectifying switching element for forming a secondary side circuit connected between an electric load and a secondary winding electromagnetically coupled to said primary winding of said transformer to drive said rectifying switching element synchronously with the switching operation of said main switching element in order to supply DC output through said secondary side circuit to said load;
- a current detector for detecting electric current flowing through said primary side circuit;
- biasing means for producing a bias voltage;
- a ramp signal generator for producing ramp signals in proportion to voltage corresponding to excitation current flowing through said transformer; and
- a comparator for driving said rectifying switching element when superimposed voltage of said detected voltage by said current detector and ramp signal from said ramp voltage generator exceeds biased voltage by biasing means.

4. A DC-DC converter of synchronous rectification type of claim 2 or 3, wherein said ramp signal generator comprises an integration circuit connected to a secondary winding of said transformer or a winding for producing voltage corresponding to the voltage on said secondary winding for producing ramp signals whose inclination is inverted every half cycle of voltage applied on said winding.

5. A DC-DC converter of synchronous rectification type of claim 2 or 3, wherein said ramp signal generator comprises a synchronizing signal generator connected to a secondary winding of said transformer or a winding for producing voltage corresponding to the voltage on said secondary winding for producing pulse signals in synchronization with frequency of voltage on the winding; and an integration circuit for producing ramp signals whose inclination is inverted every half cycle of pulse signals from said synchronizing signal generator.

6. A DC-DC converter of synchronous rectification type of claim 2 or 3, wherein said ramp signal generator comprises a waveform shaper for converting pulse signals generated from an oscillator into ramp signals whose inclination is inverted every half cycle of said output pulse signals, said pulse signals from said oscillator providing a datum of switching frequency for said main switching element.

* * * * *